United States Patent
Hearing et al.

(10) Patent No.: US 9,275,645 B2
(45) Date of Patent: Mar. 1, 2016

(54) DRONE DETECTION AND CLASSIFICATION METHODS AND APPARATUS

(71) Applicants: Brian Hearing, Falls Church, VA (US); John Franklin, Washington, DC (US)

(72) Inventors: Brian Hearing, Falls Church, VA (US); John Franklin, Washington, DC (US)

(73) Assignee: DRONESHIELD, LLC, Herndon, VA (US)

( * ) Notice: Subject to any disclaimer, the term of this patent is extended or adjusted under 35 U.S.C. 154(b) by 129 days.

(21) Appl. No.: 14/258,304

(22) Filed: Apr. 22, 2014

(65) Prior Publication Data

US 2015/0302858 A1 Oct. 22, 2015

(51) Int. Cl.
*G10L 19/00* (2013.01)

(52) U.S. Cl.
CPC ..................... *G10L 19/00* (2013.01)

(58) Field of Classification Search
CPC ...................................... G10L 19/00
See application file for complete search history.

(56) References Cited

U.S. PATENT DOCUMENTS

| | | | |
|---|---|---|---|
| 4,630,246 A | 12/1986 | Fogler | |
| 4,811,308 A | 3/1989 | Michel | |
| 5,060,206 A | 10/1991 | DeMetz, Sr. | |
| 5,721,712 A | 2/1998 | LaPointe | |
| 5,831,936 A | 11/1998 | Zlotnick et al. | |
| 6,366,240 B1 | 4/2002 | Timothy et al. | |
| 6,400,647 B1 | 6/2002 | Huntress | |
| 6,980,152 B2 | 12/2005 | Steadman et al. | |
| 7,872,948 B2 | 1/2011 | Davis et al. | |
| 7,957,225 B2 | 6/2011 | Steadman | |
| 8,059,489 B1 | 11/2011 | Lee et al. | |
| 8,446,321 B2 | 5/2013 | Smith | |
| 2002/0181721 A1 | 12/2002 | Sugiyama et al. | |
| 2007/0291123 A1 | 12/2007 | Cole | |
| 2009/0257314 A1* | 10/2009 | Davis | G01S 5/18 367/125 |
| 2010/0080086 A1 | 4/2010 | Wright et al. | |

(Continued)

FOREIGN PATENT DOCUMENTS

| | | |
|---|---|---|
| DE | 3929077 A1 | 3/1991 |
| DE | 102007062603 A1 | 12/2007 |

(Continued)

OTHER PUBLICATIONS

Ferguson et al., "Application of the short-timie Fourier transform and the Wigner-Ville distribution to the acoustic localization of aircraft", Journal of Acoustical Society of America, 1994, Aug. 1994, vol. 2.

(Continued)

*Primary Examiner* — Sonia Gay
(74) *Attorney, Agent, or Firm* — K&L Gates LLP

(57) ABSTRACT

A system, method, and apparatus for drone detection and classification are disclosed. An example method includes receiving a sound signal in a microphone and recording, via a sound card, a digital sound sample of the sound signal, the digital sound sample having a predetermined duration. The method also includes processing, via a processor, the digital sound sample into a feature frequency spectrum. The method further includes applying, via the processor, broad spectrum matching to compare the feature frequency spectrum to at least one drone sound signature stored in a database, the at least one drone sound signature corresponding to a flight characteristic of a drone model. The method moreover includes, conditioned on matching the feature frequency spectrum to one of the drone sound signatures, transmitting, via the processor, an alert.

22 Claims, 16 Drawing Sheets

(56) References Cited

U.S. PATENT DOCUMENTS

2010/0284249 A1* 11/2010 Steadman ................ G01S 5/20
367/118
2013/0119133 A1  5/2013  Michael et al.

FOREIGN PATENT DOCUMENTS

GB           2234137 A        1/1991
TW        1020130104170       9/2013

OTHER PUBLICATIONS

Quach et al., "Automatic Target Detection Using a Ground-Based Passive Acoustic Sensor", Defence Science Technology and Organisation, 1999, pp. 187-192.

Lance CPL. Ali Azimi, "Competition offers solutions to detecting UAVs", sUAS News, published Sep. 22, 2012, from http://suasnews.com/2012/19/18816/competition-offers-solutions-to-detecting-uavs/ (5 pages).

Aljaafreh et al., "Multi-Target Classification Using Acoustic Signatures in Wireless Sensor Networks: A survey", Signal Processing—An International Journal, Jan. 2010, vol. 4, Issue 4 (26 pages).

"Drone-Detector—Main features", Nov. 2, 2013, excerpt from www.drone-detector.com/en/main-features/ (3 pages).

Duarte et al., "Vehicle classification in distributed sensor networks", Journal of Parallel and Distributed Computing, 2004, (13 pages).

Yang et al., "Vehicle Identification using Discrete Spectrums in Wireless Sensor Networks", Journal of Networks, Apr. 2008, vol. 3, No. 4 (13 pages).

* cited by examiner

| DATE | TIME | DURATION | LOCATION | CLASS | BRAND | MODEL | USER ID |
|---|---|---|---|---|---|---|---|
| Feb. 6, 2014 | 1:23 P.M. | 2 MIN | ADDRESS XCV | CLASS 2 | BRAND C | MODEL 8Y | USER 007 |
| Feb. 8, 2014 | 11:41 A.M. | 12 MIN | LAT. X, LONG. Y | CLASS 5 | BRAND E | MODEL DD | USER 2312 |
| Feb. 10, 2014 | 9:22 P.M. | 3 MIN | TOWN XYZ | CLASS 1 | BRAND A | MODEL 2 | USER 9909 |
| Feb. 12, 2015 | 7:03 A.M. | 35 MIN | ZIP CODE 01010 | CLASS 2 | BRAND D | MODEL 9F | - |

1300

DRONE DETECTION AND CLASSIFICATION METHODS AND APPARATUS

BACKGROUND

Unmanned aerial vehicles ("UAV") and unmanned aircraft system ("UAS"), otherwise known as drones, were once only thought of as military aircraft. Images from the news media and the government show relatively large aircraft controlled by an operator hundreds of miles (or half a world) away. Unmanned aircraft, such as the Predator, have become famous for performing surveillance and/or delivering a weapon without risk to the operator. As the technology to control and operate unmanned aircraft has become cheaper and widely available, commercial-grade and consumer-grade drones have been developed by a variety of manufacturers. These drones can be purchased for as little as $1,000. In fact, drones have become reliable and economical enough to enable some companies, such as Amazon® and Lakemaid Beer® Company, to consider business plans that focus on the use of drones for commercial endeavors.

However, before anyone can launch their drone into the sky, the Federal Aviation Administration ("FAA") has to develop a set of commercial-grade and consumer-grade rules. Some of these rules include, for example, operator training requirements, certification requirements, communication capabilities, Sense and Avoid ("SAA") standards, separation requirements, privacy regulations, security regulations, environmental regulations, aircraft size limitations, and mode of control requirements. As mandated by the FAA Modernization and Reform Act of 2012, the FAA is required to finalize the rules and integrate drones into the national airspace by 2015.

While the actual implementation date is in question, there is no doubt commercial-grade and consumer-grade drones will become pervasive in the near future. The wide-spread use of drones may be acceptable for some individuals. However, other individuals are concerned with privacy and security. After all, it is hard to imagine the FAA will be able to regulate every single drone that takes to the sky. Unfortunately, the days of unwanted drones peering into the private lives of individuals are fast approaching.

SUMMARY

The present disclosure provides a new and innovative system, method, and apparatus for detecting and classifying drones. The system, method, and apparatus use broad spectrum matching to detect drones of varying shapes, sizes, and rotor configurations. The use of broad spectrum matching enables an entire frequency spectrum of tones emitted by a drone to be compared to a database of drone sound signatures for accurate and precise drone detections and classifications.

In an example embodiment, a drone detection device receives a sound signal in a microphone. A sound card within the device records a sound sample of the sound signal. A processor within the device processes the recorded sound sample into a feature frequency spectrum. The processor uses broad spectrum matching to compare the feature frequency spectrum to at least one drone sound signature stored in a database. The at least one drone sound signature corresponds to a flight characteristic of a drone model. The processor also transmits an alert conditioned on matching the feature frequency spectrum to one of the drone sound signatures.

Additional features and advantages of the disclosed system, method, and apparatus are described in, and will be apparent from, the following Detailed Description and the Figures.

DETAILED DESCRIPTION

Figure 1:
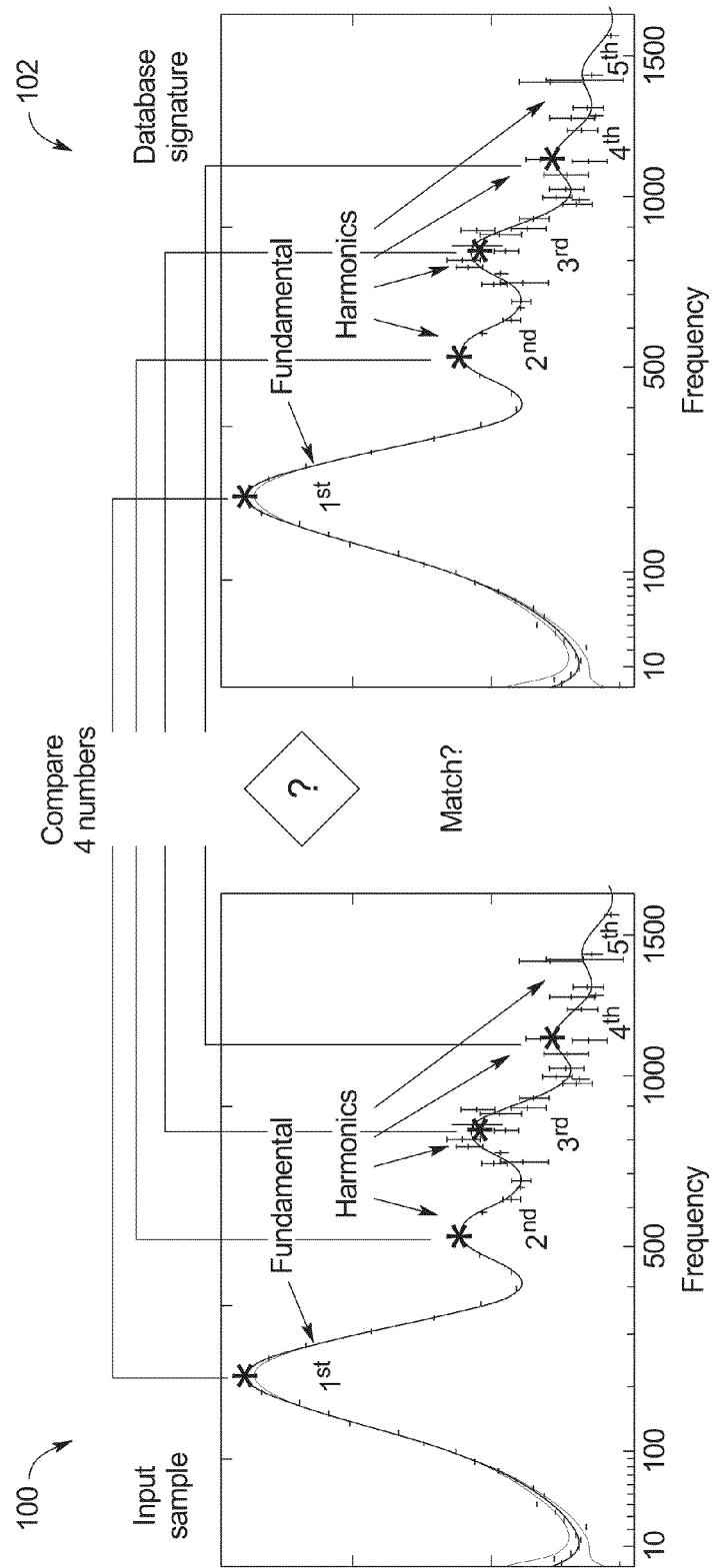
FIG. 1 shows an example of acoustic matching using peak harmonic analysis performed by a known sound detector.

The present disclosure relates in general to a method, apparatus, and system for drone detection and classification and, in particular, to a method, apparatus, and system that uses broad spectrum matching to acoustically identify UAVs (e.g., drones) that are within a vicinity or proximity of a detector. In an example, a drone detection device includes one or more microphones configured to sense sound waves (e.g., sound signals or tones) emitted by drones. The drone detection device also includes a sound card that digitizes the sound waves into, for example, a 16-bit digital sound sample. A processor within the drone detection device is configured to perform a Fast Fourier Transform ("FFT") on the sample to obtain a frequency spectrum of the sample, referred to herein as a feature frequency spectrum. The processor of the drone detector uses broad spectrum matching to compare the feature frequency spectrum of the sample to a database of drone sound signatures. It should be appreciated that the drone sound signatures not only include one sound signature for each model, class, or type of drone, but a sound signature for different flight characteristics of the different models, classes, and/or types of drones.

Conditioned on matching a feature frequency spectrum to a drone sound signature, the processor of the example drone detector is configured to determine a drone class, model, type, etc. associated with the match. Upon detecting a predetermined number of feature frequency spectrums (associated with different digital sound samples) that correspond to the same drone class, model, type, the processor is configured to determine that a drone is indeed within vicinity of the detector device and accordingly provides an alert and/or warning. As discussed in more detail below, an alert may include an email message, a text message, a message transmitted to a management server, a message transmitted to another device (such as a device to interfere with cameras, microphones, communication of the drone, where the law permits), an activation of a light, an activation of an audio warning, and/or an activation of a relay, which causes another component to function. The other component may include a motor to close and/or cover windows or doors.

As the technology for commercial-grade and consumer-grade drones becomes widely available, the use of drones throughout society becomes more of a reality. While some of these uses have significant benefits, such as same day delivery of packages, remote delivery of beverages to thirsty hunters or fisherman, or surveillance to capture accused criminals, other uses can intrude on personal liberties and freedoms. For instance, local governments have expressed an interest in using drones to enforce residential and commercial municipal codes. Media organizations have considered using drones to track or even identify news stories. It is entirely within the realm of possibilities that some individuals may use drones to spy on other individuals, such as neighbors, individuals of high importance or popularity, or targeted individuals. A neighborhood kid using a drone to sneak a peek into a girl's window (or pool) may seem innocent enough. However, drones give more sinister individuals the ability to anonymously and secretly perform surveillance to gather information for blackmail, burglary reconnaissance, social media (public) humiliation, etc.

There are some current known technologies to detect aircraft including detectors that rely on radar and/or sound. At the consumer level, radar is generally ineffective because drones often fly below the threshold detection altitude of radar. Further, many drones are small enough to avoid radar.

Detectors that rely on the detection of sound use peak harmonic matching to identify a drone. The peak harmonics are frequency spikes or peaks within the sound corresponding to fundamental and harmonic frequencies. Planes and fixed-rotor helicopters have relatively consistent tones (e.g., fundamental and harmonic frequencies) based on the configuration of rotors and/or body shape. For example, fixed-rotor helicopters have a main rotor and a tail rotor that rotate at predefined rates. Otherwise, the helicopters would spin out of control. While a helicopter may increase or decrease the speed of the rotors, this change in speed is slight compared to the overall speed of the rotors. Additionally, the range of tones produced from the different speeds of the rotors is extremely limited.

For example, FIG. 1 shows an example of acoustic matching using peak harmonic analysis performed by a known sound detector. To match sound to an aircraft, the known detector compares a recorded sound sample 100 to a database signature 102. The recorded sound sample 100 used to make the comparison is a FFT of a digitized sample of sound waves generated by the aircraft. Likewise, the database signature 102 is a FFT of a digitized sample of sound generated by a known aircraft. A processor compares the peak harmonics from the sound sample 100 to the database signature 102. The processor determines a positive match if the fundamental frequency and harmonic frequencies of the sound sample 100 substantially match the fundamental frequency and harmonic frequencies of the database signature 102. In some instances, relatively small frequency bands may be defined for the fundamental frequency and harmonic frequencies so that an exact frequency match is not required.

Figure 2:
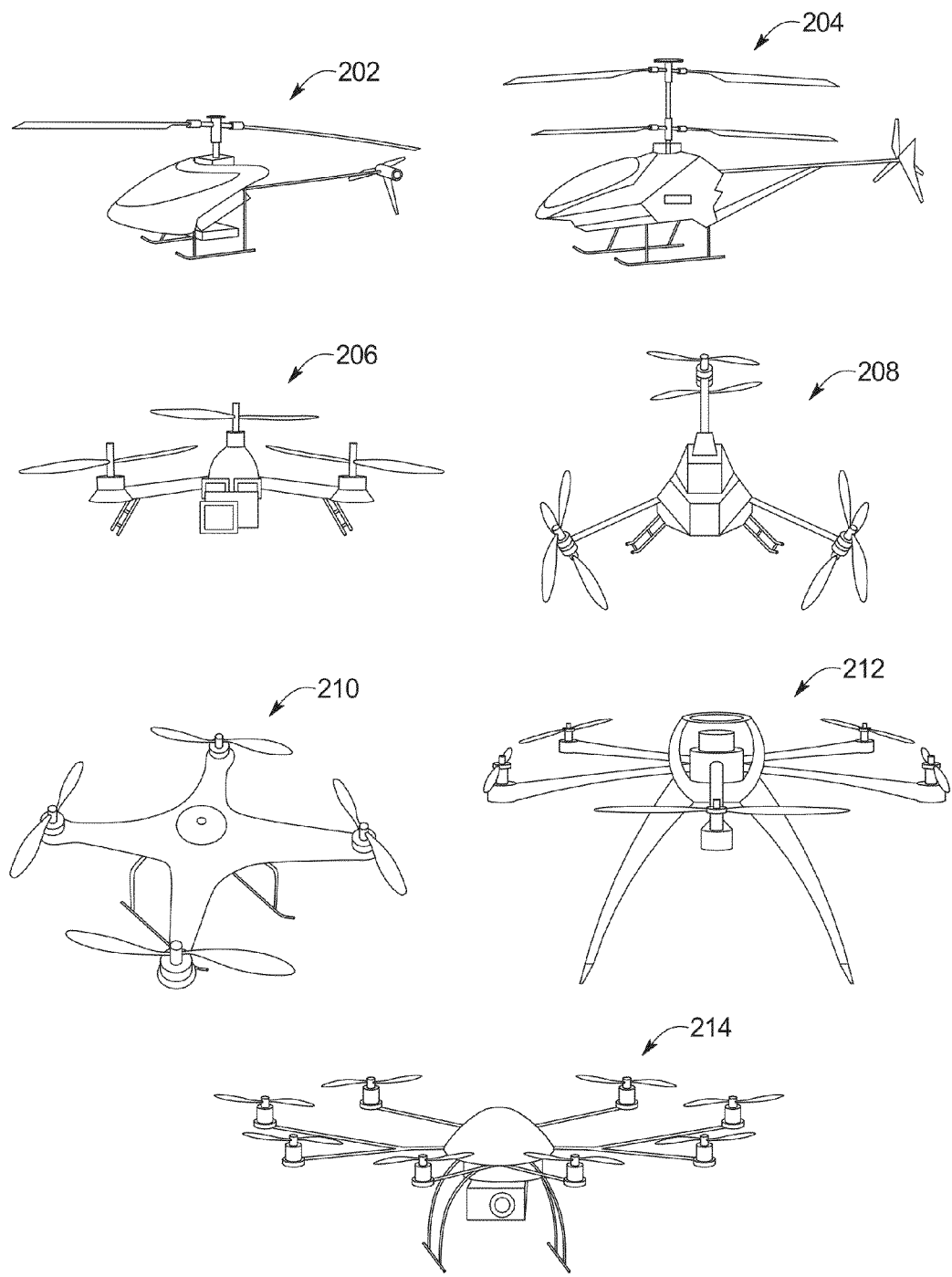
FIG. 2 shows an example of some known drone classes.

While the acoustic matching shown in FIG. 1 works well for aircraft with well-defined tones, acoustic matching cannot be used to detect drones. As an initial matter, drones come in many different shapes, sizes, and rotor configurations. FIG. 2 shows an example of some known drone classes including a single main rotor and tail rotor class 202, a single main rotor and counter-rotating main rotor class 204, a three-rotor class 206, a three-rotor and counter-rotating rotor class 208, a four-rotor class 210, a six-rotor class 212, and an eight rotor class 214. For each of these classes 202-214 (and other not shown drone classes), each rotor may be coupled to a motor that is independently controlled. In other words, there is no operational association between each of the rotors. This independent control enables drones to hover, move forward, move backward, side-to-side, ascend, descent, rotate, invert, etc. This independent control of rotors combined with the different rotor configurations produces an almost infinite number of tones or combinations of tones from the rotors at any one time. Moreover, drones can range in size from a few pounds to hundreds of pounds and have motors and/or rotors that likewise vary in size. The rotors may even be constructed of different materials (e.g., hard plastic, soft plastic, metal, etc.) for different drone models. All of these different drone characteristics produce different tones, thereby making detection and classification using peak harmonics almost impossible. The known peak harmonic matching described in conjunction with FIG. 1 is accordingly realistically incapable of accounting for all of the possible tones or combination of tones generated by drones.

The example system, method, and apparatus described herein overcome the deficiencies of systems that use peak harmonic matching by applying a broad spectrum matching approach. As discussed in more detail below, broad spectrum matching uses the entire frequency spectrum of sound samples to make a detection. Each sound sample is computed into a feature frequency spectrum using a FFT and compared to the entire frequency spectrum of known drone sound signatures. A match is determined by comparing the distance at each frequency between the feature frequency spectrum and the known drone signature (e.g., a Wasserstein metric). Relatively small distances between the feature frequency spectrum and the known signature over significant portions of the frequency spectrum indicate a match.

Previously, computations that calculated differences between distributions of data (such as frequency spectrums) were considered computationally inefficient because of the large number of individual computations needed to be performed for each comparison. A database, for example, may contain tens to hundreds or thousands of drone sound signatures, making fast detection in the past almost impossible using, for example, the Wasserstein metric. Hence, faster techniques, like the just described peak harmonic matching were used. However, with advances in computing power, the Wasserstein metric may be used to compare sound samples to hundreds or thousands of sound signatures in a database to not only detect a drone, but also to classify and identify the drone.

Throughout this disclosure, reference is made to different types of acoustic waveforms or signals. Sound signals are acoustic waves, sounds, or tones that are generated by drones. The disclosed drone detection device converts these sound signals into digital sound samples and processes these samples into one or more feature frequency spectrums, which indicate the frequency characteristics of the acoustic waves generated by drones.

In comparison to digital sound samples, drone sound samples are digital audio files stored within the drone detection device. These audio files represent recordings of drones and are organized by drone class, brand, make/model, and flight characteristics. The drone detection device is configured to process these samples into one or more drone sound signatures (e.g., a frequency spectrum of the drone sound samples). The drone detection device then uses broad spectrum matching to compare the frequency spectrum of the drone sound signatures to the feature frequency spectrums to detect and/or classify drones.

Throughout the following disclosure, reference is also made to drone classes and drone models. A drone class is a group of drones that have similar physical characteristics including size, weight, number of rotors, and configuration of rotors. FIG. 2 shows seven different types of drone classes 202 to 214. However, it should be appreciated that there are many additional drone classes not shown. For instance, the single main rotor and tail rotor class 202 (referred to herein as 'class 1') may include drones that are less than five pounds and one meter in length. A second single main rotor and tail rotor class may include drones with a single main rotor and a tail rotor that are greater than five pounds but less than thirty pounds and have a length between one meter and two meters. A third single main rotor and tail rotor class may include drones with a single main rotor and a tail rotor that are greater than thirty pounds and have a length greater than two meters.

Regarding rotor configuration, different drone classes may correspond to whether a certain number of rotors are horizontal, side-facing vertical, or front-facing vertical. Different drone classes may also correspond to whether a certain number of rotors are positioned toward a front of a drone, toward a rear of a drone, centrally positioned, etc. Further, different drone classes may also correspond to rotor size, average rotor speed, drone body type, etc. It should be appreciated that the number of different drone classes is virtually endless given the vast number of drone designs.

A drone model is a specific drone product manufactured by a specific entity. The drone model can include, for example, a make, a part number, a brand name, a product name, a stock keeping unit, etc. It should be appreciated that different entities may produce different drone models for the same drone class. For example, entity A and entity B may both produce drones that are included within the three-rotor class 206. While the material of the rotors, placement of rotors, and rotor size may vary between the models, there is enough similarity to determine the drones are part of the same class. Such a classification system provides for organization of drone sound signatures, enables detection and reporting on drone class types, and enables the drone detection device to differentiate between welcome and unwelcome drones.

Throughout the following disclosure, reference is also made to drone flight characteristics. As mentioned, the configuration of rotors enables drones to execute aerial maneuvers atypical for many aircraft. Similar to common helicopters, some of the flight characteristics include ascending, descending, rotating, hovering, sideways translating, forward movement, and backwards movement. However, drones may also execute flight characteristics that include inverting, temporary free falling, launching, and sideways-inverting. As discussed in more detail below, the example drone detection device not only includes a sound signature for each different type of drone class/drone model but also for each flight characteristic. Such a library of drone sound signatures enables the drone detection device to detect and classify drones regardless of the different types of tones emitted resulting from different flight maneuvers.

Figure 3:
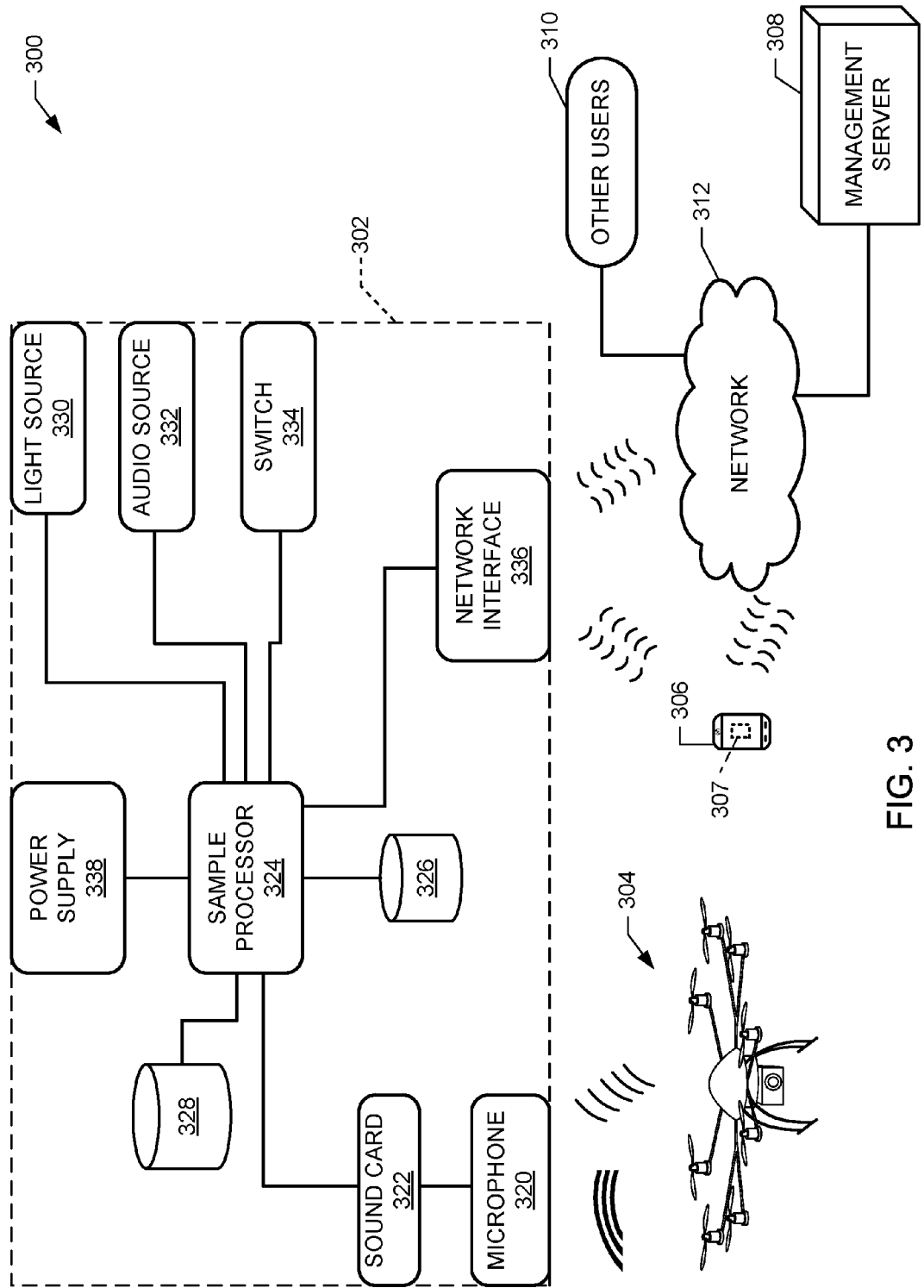
FIG. 3 shows an example drone detection environment including a sample processor and a management server, according to an example embodiment of the present disclosure.

FIG. 3 shows an example drone detection environment 300 according to an example embodiment of the present disclosure. The drone detection environment 300 includes a drone detection device 302 that is configured to detect and classify drones 304. The drone detection environment 300 also includes a user device 306 that is configured to receive alerts of detected and/or classified drones. The user device 306 may include an application 307 that is configured to graphically and/or audibly provide alerts received from the drone detection device 302 and/or configured to program or set parameters for the drone detection device 302. The drone detection environment 300 also includes a management server 308 that is configured to manage and distribute drone sound signatures (or drone sound samples), manage and transmit drone detections, and/or host a platform for a community of users 310 to report and view drone detections. The management server 308 is communicatively coupled to the drone detection device 302, the user device 306, and/or the community of users 310 via network 312 (e.g., the Internet).

Drone Detection Device

The example drone detection device 302 of FIG. 3 is configured to sense, detect, and classify drones. The example drone detection device 302 is also configured to transmit an alert conditioned upon detecting a drone. The drone detection device 302 may include a self-contained apparatus that may be positioned at any location on a user's property including within a residence, within a building, or outside. The drone detection device 302 may include an exterior casing that is constructed from metal, hard plastic, soft plastic and/or a combination thereof. In some instances, the drone detection device 302 may be water-tight to enable deployment outdoors.

While FIG. 3 shows only one drone detection device 302, it should be appreciated that a user may use more than one drone detection device to provide sufficient drone detection and classification coverage. In some embodiments, each drone detection device is assigned a unique identifier (e.g., a media access control ("MAC") address) at the time of manufacture to enable a user to determine which drone detection device 302 has detected a drone. In one embodiment, a user may program or otherwise enter a codename (or nickname) for each drone detection device 302. The drone detection device 302 then includes the codename within any detection alert transmitted to the user device 306. The user may use the user device 306 to access each drone detection device 302 (using the identifier, for example) to program the codename. Alternatively, a user may connect the user device 306 (or another computer) directly to the drone detection device 302 using, for example a universal serial bus ("USB") connection to program the codename.

Conditioned on detecting a drone, the user device 306 may display an alert to the user including the programmed codename of the drone detection device 302, a time of the detection, a determined drone class, a drone model, a drone brand, a detected flight characteristic, a determined distance from the detector 302, and/or any other information that may be determined by the drone detection device 302 and/or relevant to the user. In instances where more than one drone detection device 302 is deployed, the user device 306 (via the application 307) may be configured to show which device 302 made the detection within a graphical representation. For instance, a user may program into the user device 306 a geographic location of each drone detection device 302. The geographic location may include latitude and longitudinal coordinates, an address, global positioning signal ("GPS") coordinates, property coordinates, and/or housing coordinates. The user device 306, via the application 307, associates the geographic location with the appropriate drone detection device 302 for the selected graphical representation. For relatively large properties, the graphical representation may include a map. For relatively small areas and/or buildings, the graphical representation may include a blueprint or other drawing of the area. Such a feature enables a user to view an estimated location of the drone 304 as determined by the drone detection device 302.

In addition to programming a codename, a user may use the application 307 on the user device 306 to program detection thresholds, sensitivity of microphones, pair one or more external microphones with the drone detection device 302, specify alert types, etc. The user device 306 may also be used to specify network settings of the drone detection device 302. These network settings enable the drone detection device 302 to connect to, for example, the management server 308 and/or the network 312. The network settings may also enable the drone detection device 302 to wirelessly communicate with the user device 306 via a local area network ("LAN") and/or wireless LAN ("WLAN").

I. Microphone and Sound Card

The example drone detection device 302 includes a microphone 320 and a sound card 322 to sense and digitize sound signals. The microphone 320 may include, for example, a 3.5 millimeter hands-free computer clip-on mini lapel microphone. In other embodiments, the microphone 320 may be configured to have a sensitivity within a frequency band associated with drone tones (e.g., 1000 hertz to 15000 hertz). The microphone 320 may also be configured to have an acoustic sensitivity to detect drones within 50 feet, 100 feet, 500 feet, half of a mile, a mile, etc. based on preferences of a manufacturer and/or user. Additionally or alternatively, the microphone 320 may be configured to detect drone tones within ultrasonic frequency bands.

In some embodiments, the drone detection device 302 may include more than one microphone 320. In some instances, the microphones 320 may both be positioned with the same housing but facing different directions so as to increase the detection range of the device 302. Additionally, the drone detection device 302 may include multiple microphones 320 configured to be sensitive to different frequency bands. Such a configuration enables the drone detection device 302 to be especially precise for drones that emit a tone that standard microphones may have difficulty sensing.

In some embodiments, the drone detection device 302 is configured to support external microphones 320. For example, the microphone 320 may be connected to a cord long enough that enables the microphone 320 to be placed at a window, outside, etc., while being able to leave the drone detection device 302 inside. Alternative to using a cord, the microphone 320 may be configured to have wireless capabilities to send sensed signals to the drone detection device 302. The wireless microphone 320 may use a Bluetooth®, a Zigbee®, and/or any other wireless communication protocol to communicate with the drone detection device 302. It should be appreciated that the use of wireless microphones 320 enables a user to associate a plurality of microphones with the single drone detection device 302. For instance, a user may place microphones 320 outside or at different windows of a building, at specific points on a property, etc.

The example sound card 322 is configured to record and digitize a sound signal sensed by the microphone 320. The sound card 322 may include a 7.1 channel USB external sound card, for example. Other sound cards may also be used that are specifically configured for processing sound signals with frequencies common among drones.

The sound card 322 of FIG. 3 is configured to record a digital sample of the sound signal transmitted by the microphone 320. The length of time for each sample recording may be predetermined by a designer, a manufacturer, or a user. In some embodiments, the sound card 322 is configured to record a one second long audio clip at 22,050 samples per second with 16 bit quantization per sample. In this embodiment, the sound card 322 is configured to record consecutive clips or samples such that the each sample is processed separately and individually compared to drone sound signatures to detect and/or classify drones. The drone detection device 302 may be configured to register a drone detection only if a predetermined number (e.g., 5) of consecutive clips or samples correspond to the same drone class, drone model, drone type, etc. It should be appreciated that the record time may be shorter or longer in addition to the number of samples recorded during the record time.

The sound card 322 of FIG. 3 is also configured to digitize the sound sample into a 16-bit digital signal (e.g., 16 bit quantization per sample). In other embodiments, the sound card 322 may be configured to digitize the sound sample into an 8-bit digital sound sample, a 32-bit digital sample, a 64-bit digital sample, a 128 bit digital sample, etc. It should be appreciated that large bit samples provide more tonal resolution and may enable more precise classification and/or determination of flight characteristics among different drone type.

The use of larger bit digital signals may be based on processing capability of the drone detection system 302.

In some embodiments, the single sound card 322 may process sound signals from multiple microphones 320. For example, the sound card 322 may be configured to receive sound signals from two microphones 320 either both within a housing of the device 302, both outside of the device 302, or a combination thereof. The sound card 322 may be configured to process sound signals as they are received from the multiple microphones 320 and transmit the digitized signal. In other embodiments, the drone detection device 302 may include a sound card 322 for each microphone 320. In these examples, the device 302 may include a predetermined number of sound cards 322 to enable support for a corresponding number of microphones 320.

In yet other embodiments, the sound card 322 may be integrated with the microphone 320. For instance, a wireless microphone 320 may include the sound card 322 such that the digitized sound sample is wirelessly transmitted to the drone detection device 302. In these embodiments, the drone detection device 302 may include a wireless transceiver to receive and decode the wireless digitized sound samples. It should be appreciated that remotely located microphones 320 that do not include a sound card may transmit a wireless signal that includes information corresponding to received sound signals. The sound card 322 within the drone detection system 302 then digitizes the received wireless signal.

II. Sample Processor and Databases

The example drone detection device 302 of FIG. 3 also includes a sample processor 324 configured to convert a digitized sound sample into a feature frequency spectrum and compare the feature frequency spectrum to drone sound signatures to detect and/or classify drones. The sample processor 302 may operate on a Linux operating system (e.g., Rasbian) and use Python and PHP scripting and programming languages. In other embodiments, the sample processor 324 may operate using other types of operating systems and/or programming languages.

The drone detection device 302 also includes a drone database 326 that is configured to store drone sound signatures and a parameter database 328 configured to store parameters for drone detection and/or classification. The databases 326 and 328 may comprise any type of computer-readable medium, including RAM, ROM, flash memory, magnetic or optical disks, optical memory, or other storage medium. In addition to the databases 326 and 328, the drone detection device 302 may also include a memory to store instructions for processing digital signals into a feature frequency spectrum, comparing feature frequency spectrums to drone sound signatures, determining whether to transmit an alert, etc. The drone detection device 302 may also include a memory to store previous drone detections and/or classifications.

Figure 4:
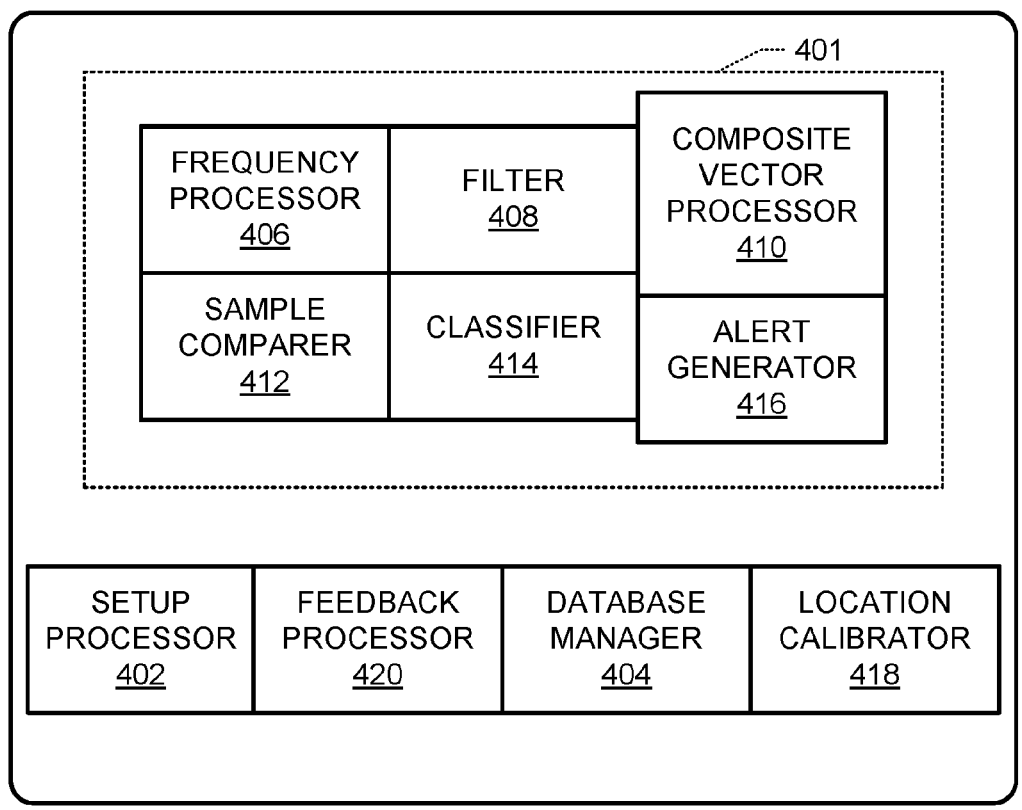
FIG. 4 shows a diagram of the sample processor of FIG. 3, according to an example embodiment of the present disclosure.

As discussed in more detail in conjunction with FIG. 4, the example sample processor 324 of FIG. 3 is configured to convert a digital sound signal into a feature frequency spectrum. The conversion includes, for example, partitioning each recorded digitalized sound sample into equal non-overlapping segments and determining a vector of frequency amplitude for each segment by calculating an absolute value of an FFT for that segment. The conversion also includes applying one or more sliding median filters to smooth the frequency amplitude vectors corresponding to the segments. The conversion further includes forming a composite frequency vector by averaging the frequency amplitude vectors of the segments. The example processor 324 may also normalize the composite frequency vector to have a unit sum. The normalized composite frequency vector is a feature vector or feature frequency spectrum used by the sample processor 324 to compare to drone sound signatures.

In some embodiments, the drone database 326 includes one or more drone sound samples stored in, for example, a Waveform Audio File Format ("WAV"), an AC-3 format, an advanced audio coding ("AAC") format, an MP3 format, etc. The drone database 326 may also include a data structure that cross-references each drone sound sample to a drone class, a drone model, a drone type, a flight characteristic, etc. In these embodiments, the sample processor 324 is configured to determine a normalized composite frequency vector (e.g., a drone sound signature) for each drone sound sample for comparison to the normalized composite frequency vector (i.e., the feature frequency spectrum) corresponding to the sound signal sensed by the microphone 320. The process for determining the normalized composite frequency vector for each drone sound sample is similar to the process described above for converting the digital sound sample from the sound card 322. The example sample processor 324 may be configured to perform this conversion on the drone sound samples upon startup, initialization, etc. when drones would not typically be present. In some instances, the sample processor 324 may store the normalized composite frequency vector for each drone sound sample to the database 326 so that the conversion is performed only once. Alternatively, the sample processor 324 may be configured to store the normalized composite frequency vector for each drone sound sample to a volatile memory such that the conversion process is repeated every time the drone detection device 302 restarts or loses power.

In addition to converting digital sound samples, the example sample processor 324 of FIG. 3 is configured to detect and classify drones. To make a detection, the sample processor 324 determines, for example, a Wasserstein metric for each drone sound signature compared to a feature vector or feature frequency spectrum recorded by the sound card 322. In other examples, the sample processor 324 may use a Euclidean distance calculation and/or an earth mover's distance calculation to make the comparison. As discussed herein, the sample processor 324 makes the comparison over the entire frequency spectrum (e.g., performs broad spectrum matching), not just at specified harmonics.

After determining, for example, a Wasserstein metric for each drone sound signature, the sample processor 324 is configured to determine the metric with the lowest value. The sample processor 324 may also determine a specified number of drone sound signatures that are closest to the drone sound signature with the lowest Wasserstein metric using, for example, a k-nearest neighbor ("k-NN") algorithm. Conditioned upon the selected drone signatures being from the same drone class, drone model, drone type, etc., the sample processor 324 is configured to determine that the comparison corresponds to a 'hit'. A detection is made if a certain number of digitalized sound samples are classified as having a 'hit' with the same drone class, drone type, drone model, etc.

The sample processor 324 of FIG. 3 is configured to classify a drone after making a detection. To make a classification, the sample processor 324 determines which drone sound signatures correspond to the 'hits'. The sample processor 324 then accesses the drone database 326 and reads the data structure that references each drone sound signature to drone class, drone model, flight characteristic, etc. After accessing the drone database 326, the sample processor 324 locally stores the determined drone class, drone model, flight characteristic, etc. for inclusion within an alert.

In some instances, the sample processor 324 may also determine a distance and/or heading of a drone after making a detection. For instance, after making a detection, the sample processor 324 may access the original digitized sound sample and determine a distance based on voltage amplitudes. Greater amplitudes correspond to closer drones. The sample processor 324 may be calibrated by a user to determine a distance based on types of microphones used, features of a detection environment, etc. The sample processor 324 may also use Doppler processing on consecutive digitalized samples to determine, for example, whether a drone is approaching or leaving and/or a heading of the drone.

The example sample processor 324 is configured to transmit different types of alerts based on, for example, preference of a user, manufacturer, etc. Depending on the type of alert, the sample processor 324 may create a message that includes a time of detection, a determined drone class (or model, brand, type, etc.), a determined flight characteristic, and/or an identifier of the drone detection device 302. The sample processor 324 formats the message based on the type of alert specified by the user. For example, the sample processor 324 may configure a message for Simple Main Transfer Protocol ("SMTP"), Short Message Service ("SMS"), File Transfer Protocol ("FTP"), Hyper Text Transfer Protocol ("HTTP"), Secure Shell Transport Layer Protocol ("SSH"), etc. After formatting the appropriate message, the example sample processor 324 transmits the message.

In some embodiments, the sample processor 324 may be configured to queue detections until specified times. In these embodiments, the sample processor 324 transmits the detections at the specified time. Additionally or alternatively, the sample processor 324 may be configured to provide different contexts of detections and/or classifications. For example, text messages may be transmitted to the user device 306 as soon as possible after a detection. However, FTP-based messages are transmitted to the management server 308 every few hours, days, weeks, etc. In this example, the text message may include specific locations on a property where a drone was detected in addition to drone class. In contrast, the FTP-based message may include day/time of detection, flight characteristics, a duration of the detection, and a drone model/brand.

As mentioned, the description in conjunction with FIG. 4 discloses further detail and features of the sample processor 324. Some of these additional features includes determining a detection duration, determining a course or flight pattern of a detected drone, determining if the drone is a friend or foe, applying localized background compensation to the conversion of digitized sound samples and/or drone sound samples, and applying user feedback regarding missed detections, false detections, missed classifications, etc. to improve detection and/or classification. Further, FIG. 4 discloses example parameters and values for converting sound samples and making detections/classifications.

III. Physical Alerts

In addition to transmitting alerts, the example sample processor 324 of FIG. 3 is configured to activate one or more physical devices to provide an alert. The devices may include a light source 330, an audio source 332, and a switch 334 (e.g., a relay). It should be appreciated that in other examples, the drone detection device 302 may include fewer or additional devices.

The example light source 330 includes a LED or other similar light emitting device. The light source 330 may be integrated within a housing of the drone detection device 302. Alternatively, the light source 330 may be remotely located from the drone detection device 302 at a position selected by a user. For example, a user may place the light source 330 on a nightstand. In these instances, the light source 330 is configured to wirelessly receive messages from the sample processor 324 to activate/deactivate.

The example audio source 332 includes a speaker or other audio output device configured to emit a warning after receiving a message (or signal) from the sample processor 324. In some instances, the sample processor 324 may control the tone or otherwise provide an audio signal for the audio source 332. For example, the sample processor 324 may enable a user to select a tone type or audio output when a drone is detected. The sample processor 324 may also enable a user to select different tones or audio outputs for different classes of drone and/or for friend or foe drones. Similar to the light source 330, the audio source 332 may be remotely located from the drone detection device 302 and wirelessly receive audio signals.

The example switch 334 is configured to close or otherwise activate upon a signal provided by the sample processor 324. The switch 334 may be used in conjunction with other components or devices provided by a user to enable the drone detection device 302 to control physical countermeasures in response to detecting a drone. For example, the switch 334 may provide power when in a closed or actuated position. A user may connect a power cord, for example, to the switch 334 so that a device connected to the power cord becomes powered when the switch 334 is closed in response to a drone detection. The switch 334 may also be connected to one or more motors that control, for example, opening/closing of window shades, blinds, covers, etc. For example, after detecting a drone, the sample processor 324 causes the switch 334 to actuate, which closes the shades on specified windows. After the drone has moved on to annoy other people and out of detection range of the device 302, the sample processor 324 opens the switch 334, which causes the shades on the specified windows to open. It should be appreciated that the number and types of devices that may be connected to the switch 334 is virtually unlimited. For instance, a user may connect a signal jamming device or an anti-drone device (where allowed by law) to the switch 334.

Similar to the light source 330 and the audio source 332, the switch 334 may be remote from the drone detection device 302. In these instances, the switch 334 (similar to the light source 330 and the audio source 332) is separately powered and wirelessly receives activation/deactivation signals from the sample processor 324. Such a configuration enables a user to place one or more switches 334 adjacent to components or devices while having the drone detection device 302 located in a more central or remote location.

IV. Network Interface

As mentioned, the sample processor 324 is configured to receive user input and transmit alerts and other data associated with alerts. The drone detection device 302 includes a network interface 336 to facilitate communication between the sample processor 324 and devices external to the device 302. The network interface 336 may include any wired and/or wireless interface to connect to, for example, the network 312 and/or the user device 306. For instance, the network interface 336 may include an Ethernet interface to enable the drone detection device 302 to connect to a router and/or network gateway. The network interface 336 may also include a WLAN interface to enable the drone detection device 302 to communicatively couple to a wireless router and/or a wireless gateway. The network interface 336 may further include a cellular interface to enable the drone detection device 302 to communicatively couple to a 4G LTE cellular network, for example. The network interface 336 may also include functionality to enable powerline communications. The network interface 336 may moreover include a Bluetooth® interface (and/or a USB interface, a Near Field Communication ("NFC") interface, etc.) to enable, for example, the user device 306 to communicate directly with the drone detection device 302 without the use if the network 312.

V. Power Supply

The example drone detection device 302 also includes a power supply 338 to provide power to, for example, the microphone 320, the sound card 322, the sample processor 324, the databases 326 and 328, the light source 330, the audio source 332, and/or the network interface 336. The power supply 338 may include a battery, and more specifically, a lithium ion battery. The power supply 338 may also include a voltage transformer to convert an AC signal from, for example, a wall outlet, into a regulated DC voltage. In some embodiments, the power supply 338 may include both a transformer and a battery, which is used when power from a wall outlet is not available. In further embodiments, the power supply 338 may include one or more solar panels, thereby enabling the drone detection device 302 to operate in remote locations.

Sample Processor Embodiment

FIG. 4 shows a diagram of the sample processor 324 of FIG. 3, according to an example embodiment of the present disclosure. The sample processor 324 includes components for detecting/classifying drones and transmitting alerts. In addition, the sample processor 324 includes components for provision, feedback, and database management. It should be appreciated that each of the components may be embodied within machine-readable instructions stored in a memory that are accessible by a processor (e.g., the sample processor). In other embodiments, some or all of the components may be implemented in hardware, such as an application specific integrated circuit ("ASIC"). Further, the sample processor 324 may include fewer components additional components, or some of the discussed components maybe combined or rearranged.

As discussed in more detail below, the sample processor 324 includes a component 401 that is configured to convert digital signals into a frequency spectrum. This includes digital sound samples sensed from a drone 304 within proximity of the drone detection device 302 and drone sound samples stored as audio files within the drone database 326. The component 401 is configured to convert digital sound samples into a feature frequency spectrum and convert the drone sound samples into drone sound signatures (e.g., a frequency spectrum of the drone sound samples). The component 401 uses broad spectrum matching to compare the feature frequency spectrum to the drone sound signatures to accordingly detect and/or classify drones.

I. Setup Processor

The example sample processor 324 of FIG. 4 includes a setup processor 402 to detect and classify drones. The example setup processor 402 is configured to prompt or otherwise receive user and/or manufacturer parameters and apply those parameters for the detection, classification and alerting of drones. The setup processor 402 may, for example, provide a user interface or web form that enables a user to specify parameters. Alternatively, a user may use the application 307 to enter parameters, which are then transmitted to the setup processor 402 for configuration.

Figure 5:
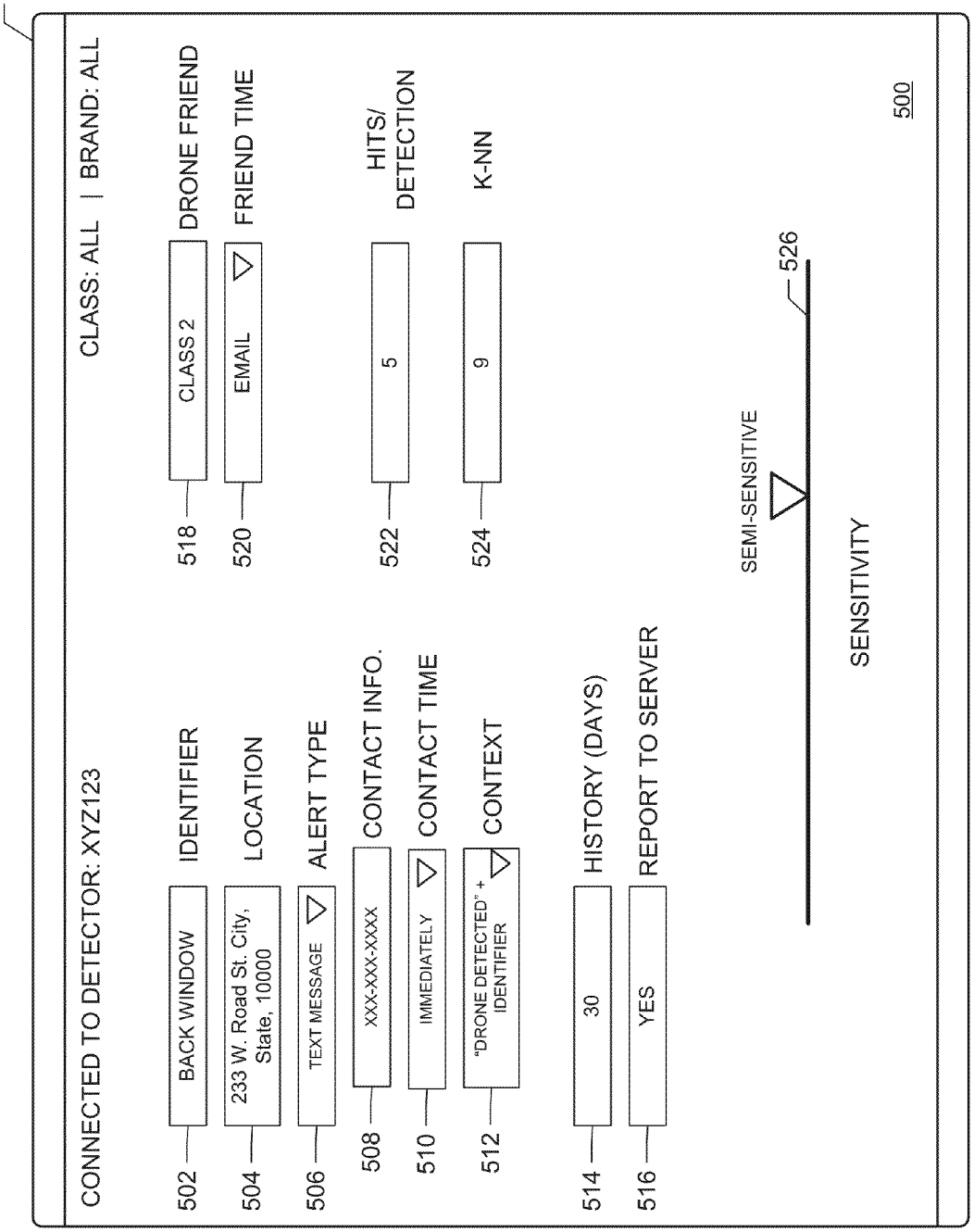
FIG. 5 shows an example user interface that enables a user to specify configuration parameters for the sample processor of FIGS. 3 and 4, according to an example embodiment of the present disclosure.

FIG. 5 shows an example user interface 500 that enables a user to specify configuration parameters for the sample processor 324 and/or more generally, the drone detection device 302. The user interface 500 may be provided by the setup processor 402 after the user device 306 directly connects to the drone detection device 302 via the network interface 336. The user interface 500 may also be provided by the application 307. Additionally or alternatively, the user interface 500 may be provided by the management server 308, which then transmits the entered parameters to the drone detection device 302 via the network 312. In these instances, the user interface 500 may also include a field for a network address and/or a MAC address of the drone detection device 302.

In the illustrated embodiment of FIG. 5, the user interface 500 includes an identifier field 502, which enables a user to specify a nickname or other identifier to organize or otherwise identify the drone detection device 302. The user interface 500 also includes a location field 504, which enables a user to specify a geographic location of the drone detection device 302. The geographic location may include an address, latitudinal and longitudinal coordinates, GPS coordinates, real estate coordinates, building or home coordinates, etc. As discussed, the location information enables the detection of a drone to be resolved to a geographic location.

The example user interface 500 also enables a user to specify alert types within field 506. A user may select one or more alert types, which causes the user interface 500 to display the appropriate contact fields 508, 510, and 512. For instance, selection of an email contact type causes an email-based field 510 to be displayed. In another example, selection of an audio alert type within the field 506 causes a field to be displayed that enables a user to select a tone, song (e.g., "Danger Zone" by Kenny Loggins), or other audio indicator. The user interface 500 may also include a feature that enables a user to link or otherwise associate a remote light source 330, audio source 332, switch 334, and/or microphone 320 with the drone detection device 302 (e.g., initiate a Bluetooth® connection procedure).

The example content field 512 enables a user to specify a context in which an alert is to be provided. In this embodiment, a user has selected to receive a text message with the text of "drone detected" and the identifier specified in the field 502. In other embodiments, a user may select a map context, which causes the sample processor 324 to use the geographic location in the field 504 within a graphical representation showing a location of the detection. In some instances, the sample processor 324 may include the geographic location within the alert with a flag or other message instructing the application 307 to display the location within a graphic representation, such as a map.

Example field 514 of FIG. 5 enables a user to specify how many days drone detections are to be stored until being deleted. Example field 516 enables a user to specify whether detections are to be reported to the management server 308. The context of detection information transmitted to the server 308 may be specified by the server 308 and/or the user. For instance, a user may request that the geographic location is not permitted to be sent.

The example user interface 500 also may include fields that enable a user to specify friend versus foe drones. For instance, a user may wish to not be alerted when a drone from Amazon® delivers a package. Alternatively, a user may wish to receive an alert (or a different alert) for only friendly drones as a way to receive a notice regarding the delivery of a package. The user accordingly specifies a class of the Amazon® drone within field 518 and a notice of the friend drone within field 520. Alternative to specifying a class, a user may provide a drone model and/or other information that identifies a drone.

The example notice field 520 specifies when the friendly drone is expected. For example, a detection of a class 2 drone outside of the specified time may be regarded as a foe drone. A user may enter a time, a date, or an information source within the field 520. In this embodiment, a user provides an email address or email account, which the sample processor 324 may access to view emails regarding delivery of packages and accordingly set the friend time period to the delivery time/date. In an alternative embodiment, the application 307 may access the email account or a user may have specific emails forwarded to the application 307 and/or management server 308, which then transmits the friend date/time to the drone detection device 302 via the network interface 336.

The example user interface 500 also may include fields that specify how the detection and classification algorithm operates. A number of hits per detection field 522 enables a user to specify a number of consecutive 'hits' of samples are needed before a detection is determined. A k-NN field 524 enables a user to specify how many next lowest drone sound signatures are used when determining whether to register a 'hit'. A lower numerical value may increase the chances of detecting a drone but may reduce the accuracy of the classification. A sensitivity field 526 enables a user to select (via a scroll bar in this example) a volume threshold, which specifies a threshold that sound signals must exceed before processing into a feature frequency spectrum is permitted.

After receiving a user's selection of the parameters within the user interface 500, the example setup processor 402 of FIG. 4 is configured to store the parameters to the parameter database 328. The sample processor 324 accesses the parameters to, for example, populate variable values for drone detection and/or classification algorithms. The sample processor 324 also accesses the parameters to determine how alerts are to be transmitted.

II. Database Manager

The example sample processor 324 of FIGS. 3 and 4 is configured to use a database manager 404 to access the drone database 326 for drone sound samples and/or drone sound signatures. Drone sound samples are acoustic samples of drones flying under a variety of conditions (e.g., flight characteristics). The acoustic samples may be stored as a WAV file, an AC-3 file, an AAC file, an MP3 file, or any other audio file. Each recording is labeled or otherwise associated with a make, model, class, brand, etc. of the drone that generated the acoustic sample. In some instances, the make, model, class, etc. may be stored as metadata of the audio file.

Figure 6:
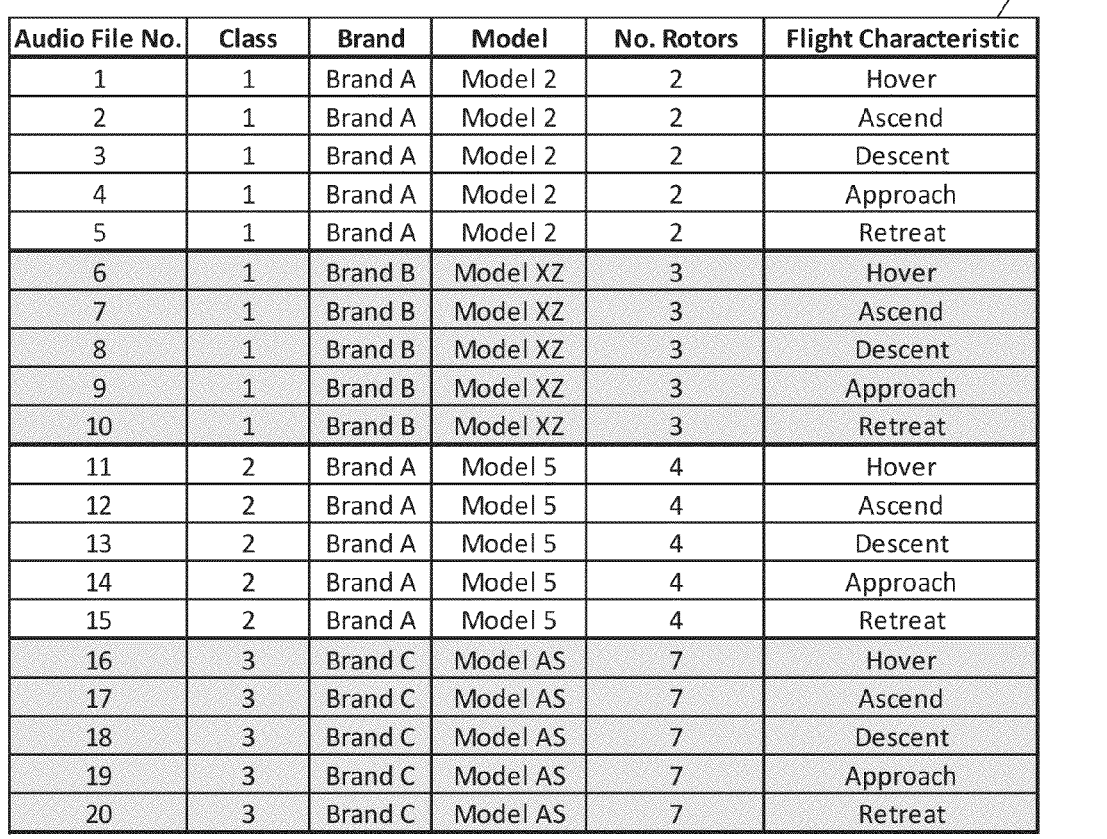
FIG. 6 shows an example data structure of audio files of drone sound samples stored in associated with drone class, brand, model, number of rotors, and flight characteristic information within the drone detection device of FIG. 3, according to an example embodiment of the present disclosure.

FIG. 6 shows an example data structure 600 of audio files of drone sound signatures stored in association with drone class, brand, model, number of rotors, and flight characteristic information. It should be appreciated that in other embodiments, the data structure 600 may include fewer or additional fields. Moreover, while the data structure 600 is shown as a flat file, in other embodiments the data structure 600 may be hierarchal with at a highest level corresponding to drone classes, a second level corresponding to drone makes/models, and a lowest level corresponding to flight characteristics.

As mentioned, each audio file includes a recording of a drone. The recording may have a duration of one second, two seconds, five seconds, etc. The duration should be long enough to at least match the duration of a recording performed by the sound card 322. The sample processor 324 may be configured to compare multiple different separate portions of the same drone sound sample to recorded sound samples to make a detection. For instance, a drone sound sample having a ten second duration may be partitioned into ten consecutive samples and individually compared to the sound signal detected by the microphone 320. Such a comparison provides more accurate detections because a tone of a drone may change even during the recording of a relatively short sample. Additionally, comparisons using the different portions from the same drone sound sample potentially account for any acoustic deviations between individual drones of the same class, brand, model, etc.

In some embodiments the drone sound sample may be partitioned into separate portions based on different flight characteristics associated with different parts of the sample. For instance, different flight characteristics may be time-stamped or otherwise marked to a timeline (e.g., within metadata) of a drone sound sample. An individual making the recording may note the flight characteristics at the specific times. The database manager 404 and/or the management server 308 may use the markings of the flight characteristic to break the recording into separate drone sound samples and/or select different portions of a single drone sound sample.

The recording may be made by a manufacturer and stored to the data structure 600 at a time of manufacture. Recordings may also be made by a manufacturer or third-party and stored to the management server 308, which periodically transmits the recordings to the database manager 404 for storage in the drone database 326. In this manner, the drone detection device 302 is capable of receiving drone sound samples as new drones are released to the market. This configuration also facilitates a crowd-sharing component, where the other users 310 may contribute recordings of drone sound samples, thereby increasing the number of available drone sound samples available to make a detection. These other users 310 may record the drone sound samples with their own drone detection devices 302 (or other suitable recording devices such as a smartphone), enter the drone information via the application 307 (or an interface of the management server 308) and upload the drone sound samples.

The example database manager 404 is configured to manage the storage and organization of newly received drone sound samples. In some instances, the data manager 404 may store multiple drone sound samples for the same class, brand, flight characteristic. Alternatively, the database manager 404 may only retain a most recent drone sound sample. The database manager 404 may also remove outdated or otherwise incorrect drone sound samples per direction from, for example, the management server 308.

In addition to managing the storage of drone sound samples, the database manager 404 may also be configured to manage the storage of drone sound signatures. As mentioned, a drone sound signature is a frequency spectrum of a drone sound sample after FFT processing, filtering, and frequency vector determination. The database manager 404 may store drone sound signatures after conversion at initialization of the drone detection device 302 so that the conversion does not need to be repeated. The database manager 404 may also determine newly received drone sound samples and cause only these newly received signals to be processed into drone sound signatures.

III. Frequency Processor

Figure 7:
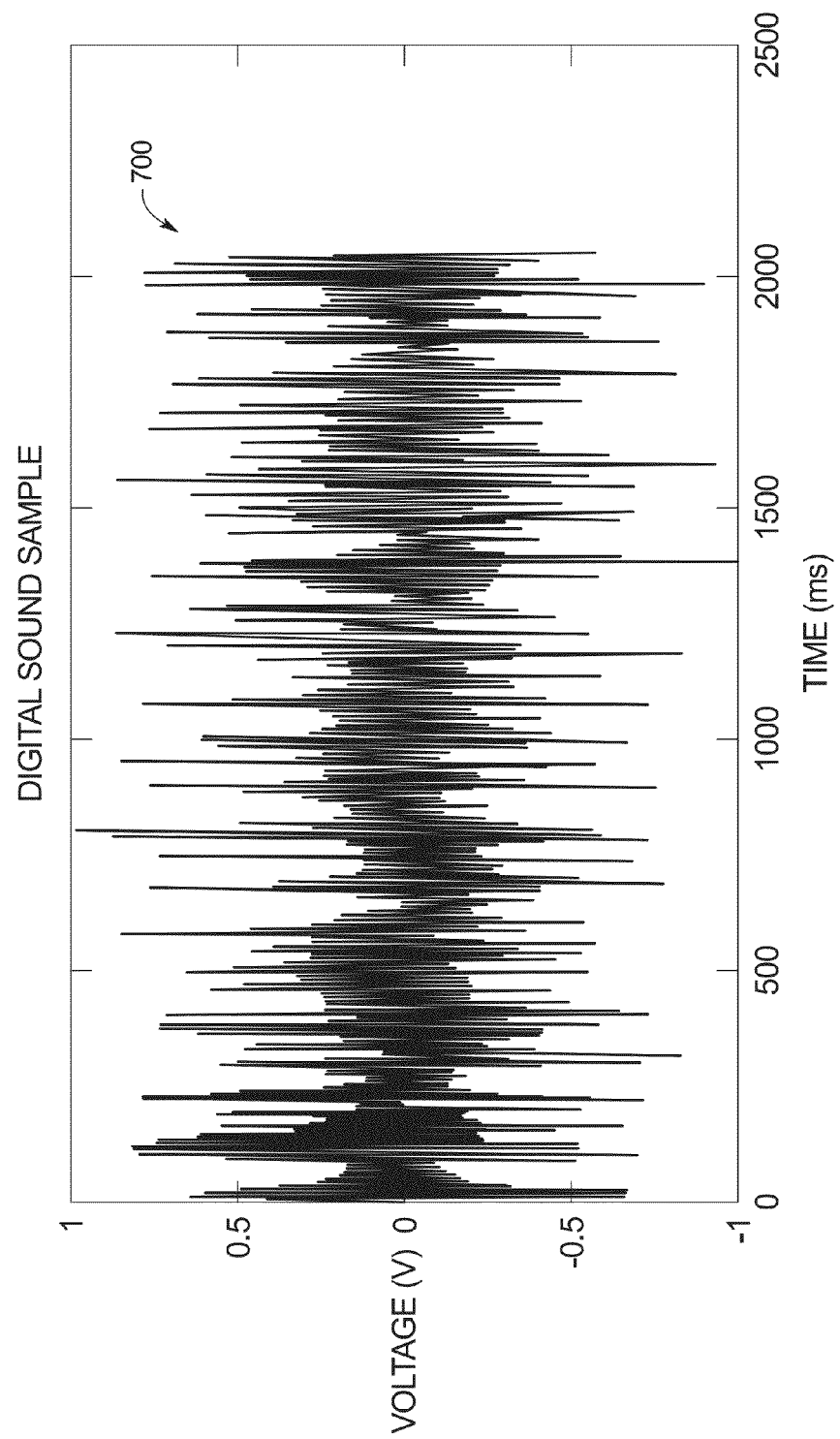
FIG. 7 shows an example digital sound sample (or drone sound sample) received by the sample processor of FIGS. 3 and 4, according to an example embodiment of the present disclosure.

The example component 401 of the sample processor 324 of FIG. 4 includes a frequency processor 406 (e.g., a frequency calculator) to convert a digital sound sample (or a drone sound sample) into one or more frequency amplitude vectors. FIG. 7 shows an example digital sound sample 700 (or drone sound sample) received by the frequency processor 406. The sound card 322 may have digitized the digital sound sample 700 from a sound signal sensed by the microphone 320 using, for example, a sample rate of 22,050 samples per second with a 16-bit quantization per sample.

As shown in FIG. 7, the digital sound sample 700 is a waveform recorded over time with the amplitude of the waveform corresponds to a voltage. The time scale is in milliseconds and the voltage scale is in volts. The digital sound sample 700 has a total duration of two seconds. In other embodiments, the digital sound sample 700 may have a total duration of one section.

The example frequency processor 406 is configured to split or otherwise partition the digital sound sample 700 (or the drone sound sample) into, for example, ten equal-sized non-overlapping 0.1 second segments. The frequency processor 406 may select a window for the segments in instances where the total duration is greater than one second. In this embodiment, the frequency processor 406 may select the digital sound sample 700 between 0.5 seconds and 1.5 seconds for the ten segments. In other embodiments, the frequency processor 406 may partition a sample into fewer or more segments and the duration of each segment may be less than, equal to, or greater than 0.1 seconds. For instance, the number of segments and/or the segment duration may change based on a setting of the sensitivity field 526 of FIG. 5.

Figure 8:
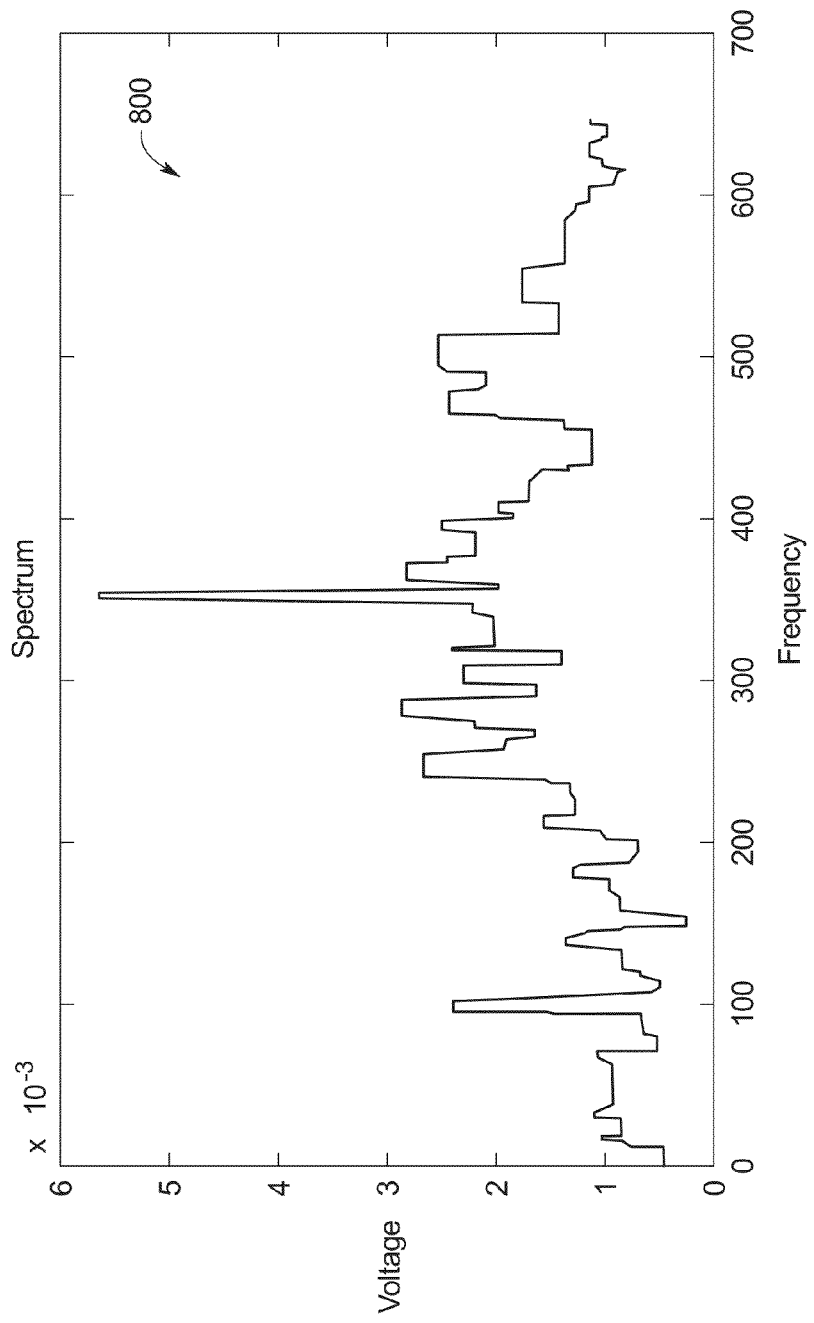
FIG. 8 shows a frequency amplitude vector that was computed by the sample processor of FIGS. 3 and 4, according to an example embodiment of the present disclosure.

The example frequency processor 406 is also configured to convert each of the ten segments into respective vectors of frequency amplitudes. For each segment, the frequency processor 406 determines a vector of frequency amplitudes by computing an absolute value of an FFT of the segment. FIG. 8 shows a frequency amplitude vector 800 (e.g., a raw frequency spectrum) that was computed by the frequency processor 406 determining an absolute value of an FFT of a 0.1 second segment of the digital sound sample 700 from 0.5 seconds to 0.6 seconds. The frequency processor 406 is configured to computer the FFT of the 0.1 second segment at, for example, 11,050 Hz using 11 Hz bin widths and a total of 1024 bins. The example frequency processor 406 may use any type of FFT algorithm to determine the frequency amplitude vectors 800 including, for example, Rader's FFT algorithm, the Prime-factor FFT algorithm, Bruun's FFT algorithm, Bluestein's FFT algorithm, the Cooley-Tukey FFT algorithm, etc.

IV. Filter

The example sample processor 324 of FIG. 4 includes a filter 408 configured to remove noise from each of the frequency amplitude vectors 800 for the respective segments. The filter 408 may use, for example, a sliding median filter to smooth each of the frequency amplitude vectors 800. The example filter 408 may also use a bandpass filter to remove noise. The bandpass filter may be configured to pass, for example, the 3 kHz to 9 kHz frequencies of the frequency amplitude vectors 800 to remove noise and other unwanted acoustic artifacts. The bandpass filter may use, for example, approximately 600 bins for the filtering. It should be appreciated that the bandpass filter may be adjusted based on tones generated by drones.

V. Composite Vector Processor

The example sample processor 324 of FIG. 4 includes a composite vector processor 410 configured to combine each of the segments into a single frequency vector. For example, the composite vector processor 410 is configured to combine the segments by determining an average of all of the filtered frequency amplitude vectors (associated with the same digital sound sample or same portion of the digital sound sample) corresponding to the segments (e.g., the ten segments from the digital sound sample 700) and creating a composite frequency amplitude vector based on the determined average. In some embodiments, the composite vector processor 410 may weigh each of the filtered frequency amplitude vectors differently based on, for example, an amount of noise removed, an order within a sequence, etc.

Figure 9:
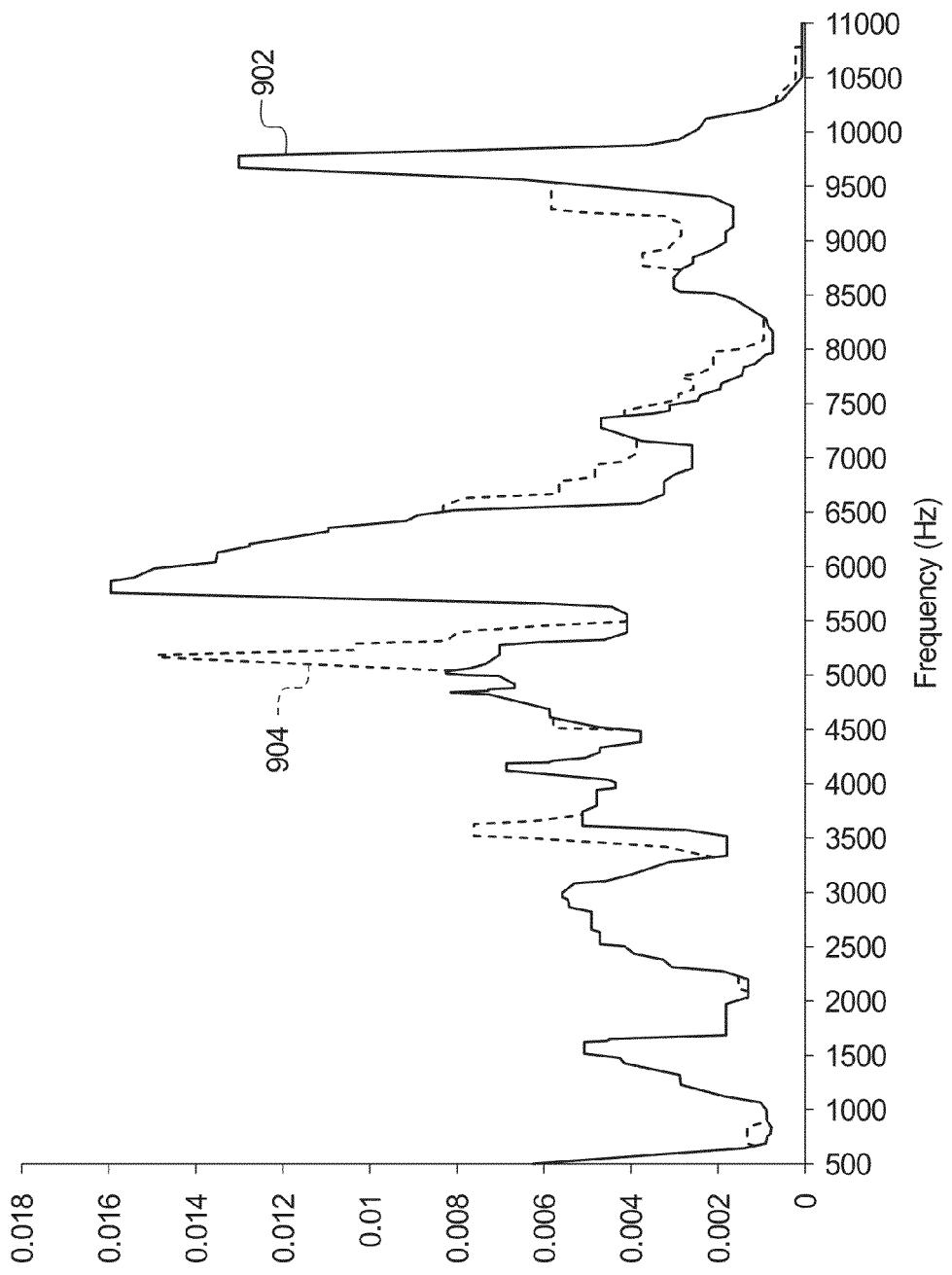
FIG. 9 shows a first normalized composite frequency amplitude vector, referred to herein as a feature frequency spectrum and a second normalized composite frequency amplitude vector, referred to herein as a drone sound signature, according to an example embodiment of the present disclosure.

The example composite vector processor 324 is also configured to normalize the composite frequency amplitude vector to have a unit sum. Normalizing to a unit sum may reduce processing calculations needed to make a comparison to drone sound signatures. FIG. 9 shows a normalized composite frequency amplitude vector, referred to herein as a feature frequency spectrum 902. FIG. 9 also shows a normalized composite frequency amplitude vector, referred to herein as a drone sound signature 904.

It should be appreciated that the composite vector processor 410 (as well as the frequency calculator 406 and the filter 408) are configured to convert drone sound samples into drone sound signatures 904 before converting the digital sound sample from, for example, the drone 304 into the feature frequency spectrum 902. The creation of the drone sound signatures 904 may occur, for example, after initiation or startup of the drone detection device 302. The composite vector processor 324 may be configured to store the drone sound signatures 904 to the drone database 326 so that the corresponding drone sound samples do not need to be reprocessed in the event the drone detection device 302 restarts or loses power. Further, the composite vector processor 410 may also store feature frequency spectrums to memory.

VI. Sample Comparer

The example sample processor 324 of FIG. 4 includes a sample comparer 412 to determine a difference between each drone sound signature 904 and the feature frequency spectrum 902 using broad spectrum matching. FIG. 9 shows a graphical representation of the comparison between one of the drone sound signatures 904 and the feature frequency spectrum 902. To determine a distance between the feature frequency spectrum 902 and the drone sound signature 904, the sample comparer 412 is configured to determine a linear distance between the feature frequency spectrum 902 and the drone sound signature 904 for each frequency (or frequency band), thereby making a comparison over the entire frequency spectrum under analysis (e.g., broad spectrum matching). The sample comparer 412 is also configured to integrate (or otherwise sum) the determined linear distances over the entire frequency spectrum to calculate a single distance value. In other words, the sample comparer 412 determines the difference in total area between a feature frequency spectrum and each drone sound signature. The sample comparer 412 may determine this difference in area using, for example, a Wasserstein metric, an earth-mover's distance algorithm, a Euclidean distance algorithm, etc.

It should be appreciated that the determination of a Wasserstein metric for each drone sound signature 904 compared to the single feature frequency spectrum 902 requires significant computational resources to calculate the difference in area between the two distributions of frequency spectrums. The drone database 326 may include hundreds to thousands of drone sound signatures, which means hundreds to thousands of comparisons are processed by the sample classifier for each feature frequency spectrum 902. In addition, each feature frequency spectrum 902 corresponds to a one second sample. A drone may be within proximity of the drone detection device 302 for a number of seconds to a number of minutes, or even hours. The sample comparer 412 accordingly has to compare tens to hundreds of feature frequency spectrums (each corresponding to a one second sample) to the hundreds or thousands of drone sound signatures to make accurate and precise drone detections and classifications. The sample comparer 412 accordingly has to make a comparison of each feature frequency spectrum to the entire database of drone sound signatures within one second or so. Otherwise, a processing queue will quickly form that will cause response times to degrade.

In some embodiments, the sample processor 324 may use a plurality of sample comparers 412 to more quickly compare in parallel a feature frequency spectrum to the database of drone sound signatures. The sample processor 324 may also be configured to select only a subset of drone sound signatures once an initial determination of drone class has been made. For example, within the first few seconds of sensing a drone, the sample processor 324 may determine that the drone corresponds to a class 2 drone. To reduce the number of computations, the sample comparer 412 may be configured to only compare subsequent feature frequency vectors to class 2 drone sound signatures and/or sound signatures of other classes that are similar to class 2 drone sound signatures.

VII. Classifier

The example sample processor 324 of FIG. 4 includes a classifier 414 to detect and classify a drone detection. For each feature frequency spectrum 902 (e.g., each digital sound sample), the example classifier 414 is configured to determine a lowest distance or area value (e.g., the Wasserstein metric) corresponding to the plurality of drone sound signatures 904. The lowest value corresponds to the drone sound signature 904 that best matches the feature frequency spectrum 902. The classifier 414 determines a drone class, model/make, brand, etc. (and flight characteristic) that corresponds to the selected drone sound signature 904.

a. False Classification Processing

To reduce false classifications, the example classifier 414 is configured to determined a specified number (e.g., nine) of drone signatures that have a next lowest Wasserstein metrics. The specified number may be determined, for example, based on a user providing a value in the field 524 of FIG. 5 and/or the specified number may be set by a manufacturer. The classifier 414 determines a drone class, model/make, brand, etc. that corresponds to the selected drone sound signatures having the next lowest Wasserstein metric.

The classifier 414 compares the drone class, brand, make/model, etc. of the drone sound signature 904 with the lowest Wasserstein metric to the drone class, brand, make/model, etc. of the drone sound signatures with the next lowest Wasserstein metrics. Conditioned on the drone classes, make/models, brands matching, the classifier 414 is configured to register a 'hit' classification for the feature frequency spectrum 902. The 'hit' classification includes, for example, a time of detection, the detected drone class, make/model, brand, etc., flight characteristic, and an identification of the feature frequency spectrum 902 and the drone sound signatures used to make the classification. It should be appreciated that the classifier 414 may use any algorithm to make the classification including, for example, a k-NN algorithm.

The classifier 414 is also configured to determine when the feature frequency spectrum 902 does not correspond to a drone. For instance, the classifier 414 may determine that a drone is not present if the drone class, make/model, brand, etc. does not match the specified next lowest number of Wasserstein metrics. Additionally or alternatively, the classifier 414 may determine that a drone is not present if the lowest Wasserstein metric is above a threshold and/or if a specified number of the Wasserstein metrics are not below a threshold. As discussed in conjunction with FIG. 5, the threshold may be set by a user providing an input via the sensitivity field 526.

The classifier 414 may also be configured to determine a drone is present but may not be able to classify the drone. For example, less than the specified number of next lowest Wasserstein metrics may match the drone class, make/model, brand of the drone corresponding to the lowest Wasserstein metric. This may be enough information for the classifier 414 to alert a user that a drone is present. However, the classifier 414 may provide an indication that the drone class, make/model, brand, etc. cannot be determined. Such a detection may be referred to as a 'partial-hit' classification.

To further reduce false classifications, the example classifier 414 is configured to determine a specified number of consecutive 'hits' (or 'partial-hits') before an alert is transmitted. For instance, a user may specify the number in the hits per detection field 522. The classifier 414 uses this number to determine when a number of consecutive digital sound samples (e.g., consecutive feature frequency spectrums associated with the same drone class, make/model, brand, etc.) with a 'hit' classification reaches the specified number. Conditioned on reaching the specified number, the classifier 414 determines that a drone is indeed present and uses the information associated with the detection to classify the drone.

Figure 10:
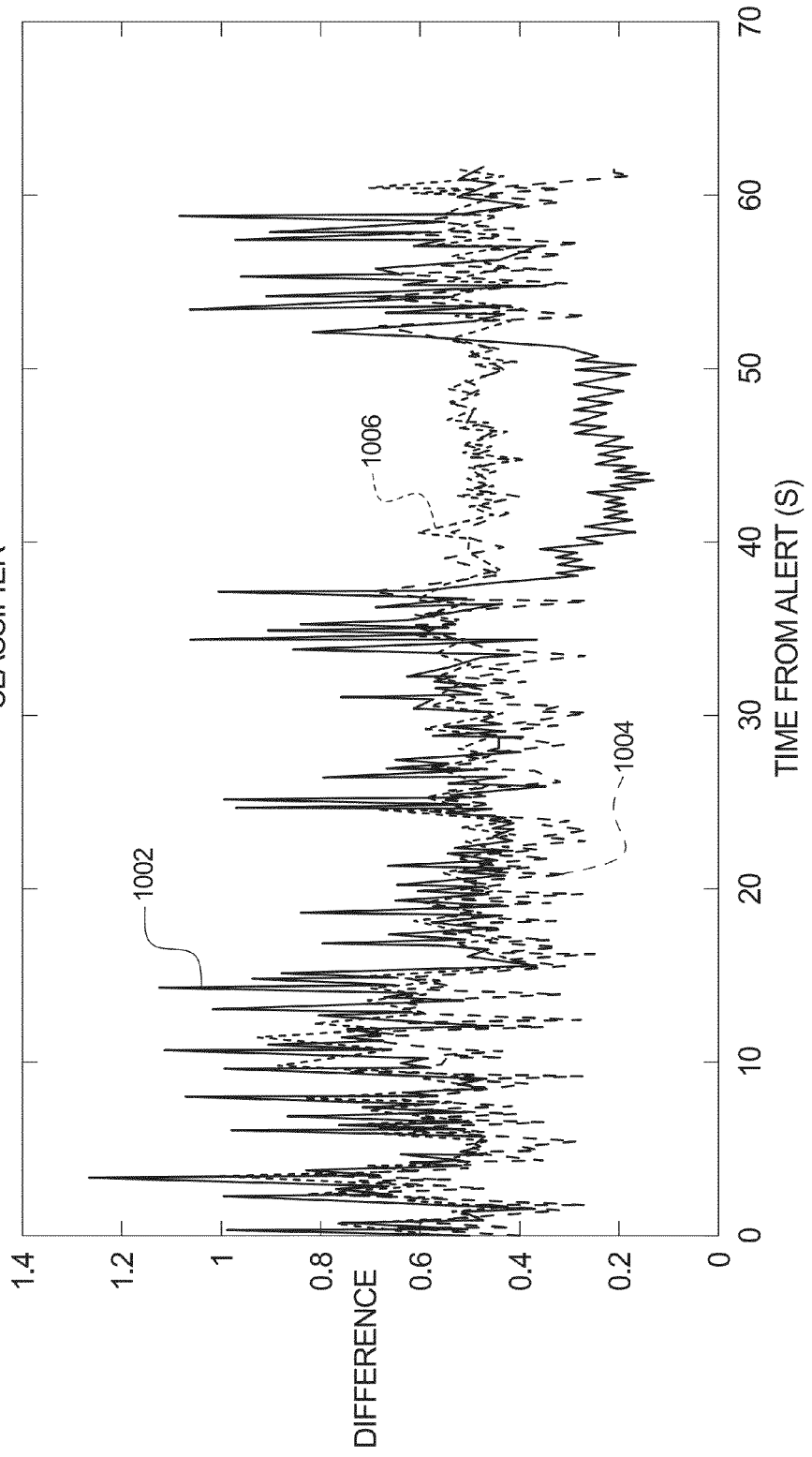
FIG. 10 shows a graphical representation of Wasserstein metrics for different drone sound signatures over a time period of a detection, according to an example embodiment of the present disclosure.

FIG. 10 shows a graphical representation of Wasserstein metrics for different drone sound signatures over a time period of a detection. Each feature frequency spectrum and corresponding digital sound sample covers 0.1 seconds. FIG. 10 accordingly shows 62 seconds of detection, which amounts to the processing of 620 digital sound samples into feature frequency spectrums. For brevity, FIG. 10 shows only three waveforms 1002, 1004, and 1006 corresponding to respective drone sound signatures. However, it should be appreciated that FIG. 10 could include a plot of Wasserstein metrics for all drone sound signatures computed during the detection time.

As shown in FIG. 10, the amount of difference between a drone sound signature and feature frequency spectrums change for each feature frequency spectrum. This difference corresponds to different flight characteristics of the drone or tonal variations of the drone. For example, the waveform 1002 may correspond to a drone sound signature having a hover flight characteristic. The difference from the feature frequency spectrum is relatively small in instances where the detected drone is hovering (or near hovering) and relatively large in instances where the drone is moving. Such differences are one reason why drone sound signatures are provided for the same class, make/model, brand, etc. with different flight characteristics. Such differences are also why detection and classification is based on drone class, brand, make/model, etc., namely to account for different tones resulting from the wide variety of flight characteristics.

Returning to FIG. 4, conditioned on the classifier 414 determining that the number of consecutive 'hits' satisfies the specified number, the classifier 414 transmits a message to an alert generator 416. The message includes, for example, a time of detection, the detected drone class, make/model, brand, etc. and an identification of the feature frequency spectrum and the drone sound signatures used to make the classification. The classifier 414 may continue to record 'hits' and/or 'partial-hits' to determine a duration of the drone incursion and an estimated flight path of the incursion.

Conditioned on the classifier 414 determining that a number of 'partial-hits' satisfies a specified number, the classifier 414 transmits a message to an alert generator 416 indicating the detection. The message may also include the two or more possible drone classes, make/models, brands, etc. associated with the detection and/or an identification of the feature frequency spectrum and the drone sound signatures used to make the detection. The message may also include the one or more flight characteristics associated with the matching drone sound signatures.

b. Duration and Flight Tracking Processing

In addition to detecting and classifying drones, the classifier 414 is also configured to determine how long a drone is within vicinity of the drone detection device 302 and determine an estimated flight path. In other embodiments, the classifier 414 may be configured to store the data associated with the detection and/or classification to enable, for example, the application 307 and/or the management server 308 to determine the duration and/or flight path. For instance, each 'hit' corresponds to specific time and flight characteristic. The classifier 414 may compile 'hits' to determine a total duration of the drone incursion. The classifier 414 may also compile the flight characteristics corresponding to the 'hits' to determine how the drone was operating (e.g., ascending, approaching, hovering, descending, retreating, etc.). The classifier 414 (or application 307/management server 308) may use this data to construct a plot of the drone's flight over the detection time.

To further refine the information regarding the drone's flight, the classifier 414 may determine a distance (and/or heading) of a drone based on the digitized sound samples. For instance, the classifier 414 may use a voltage amplitude of the digital sound sample to determine a distance from the microphone 320 to the drone 304. The classifier 414 may also use Doppler processing to determine a direction of movement of the drone. The classifier 414 associates the digital sound sample with the 'hit' time and associates the distance and/or heading information with the flight characteristic.

Figure 11:
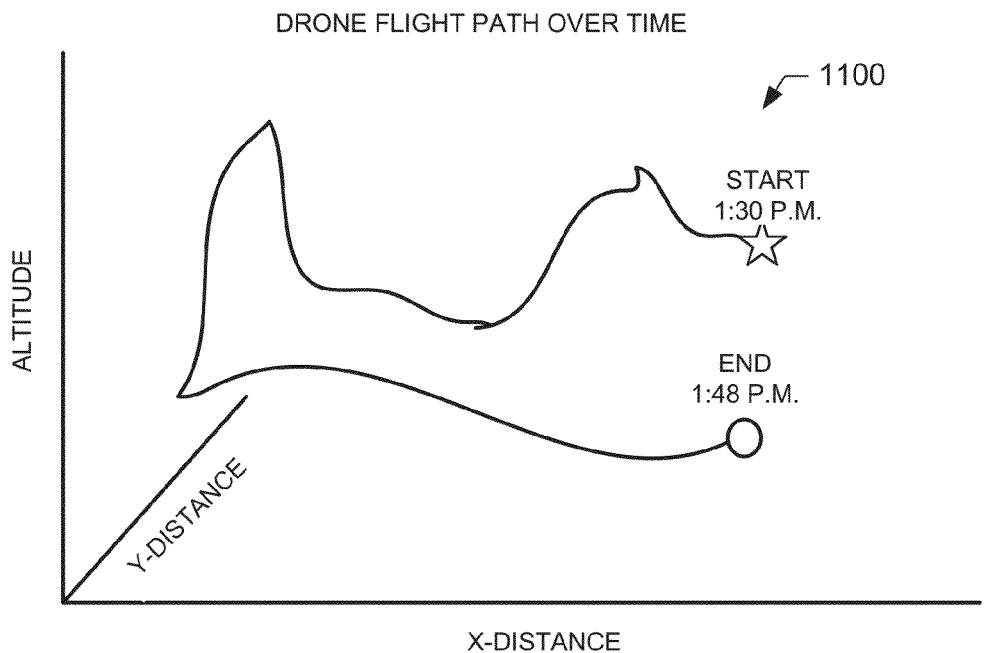
FIG. 11 shows an example graphical representation of a flight path of a drone during a detection as determined by the sample processor of FIGS. 3 and 4, according to an example embodiment of the present disclosure.
Figure 12:
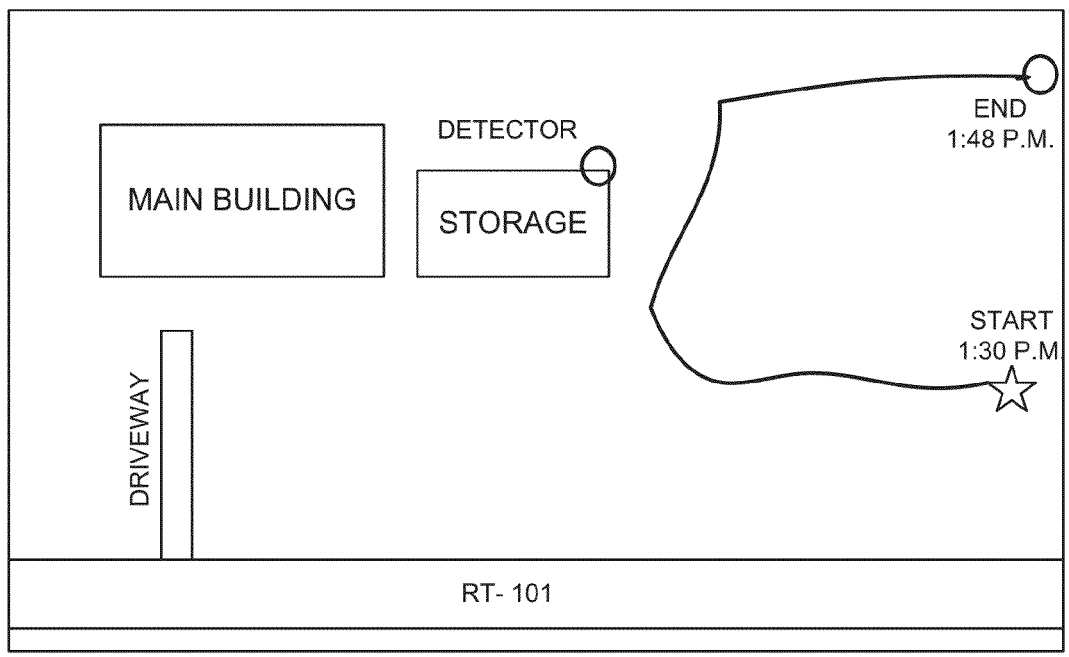
FIG. 12 shows a graphical representation of the flight path of FIG. 11 within a map of a user's property, according to an example embodiment of the present disclosure.

FIG. 11 shows an example graphical representation of a flight path 1100 determined by the classifier 414. The flight path 1100 shows an altitude of a drone in conjunction with an X-distance and a Y-distance from the microphone 320 over the detection time. The flight path 1100 may be resolved by, for example, the classifier 414, the application 307, and/or the management server 308 into a map or other graphical representation based on a geographic location of the drone detection device 302 and/or the microphone 320. In this manner, the flight path 1100 may be shown relative to a map of a user's property (as shown in FIG. 12) to illustrate where and when the drone incursion began, where the drone traveled on the property during the incursion, and where and when the incursion ended.

VIII. Alert Generator

The example sample processor 324 of FIG. 4 includes an alert generator 416 to create and transmit alerts responsive to the classifier 414 detecting and/or classifying a drone. The example alert generator 324 creates an alert based on preferences by the user, as discussed in conjunction with FIG. 5. The alert generator 416 may also transmit a flight path and/or graphical representation of a drone detection in relation to a map. The alert generator 416 may further transmit a message indicative of the end of a drone detection.

As discussed, the alert generator 416 is configured to create a message specific for the protocol specified by a user. The alert generator 416 is also configured to activate/deactivate the light source 330, the audio source 332, and/or the switch 334. The alert generator 416 may also queue detections and corresponding detection information for transmission to the management server 308. Moreover, the alert generator 416 is configured to store to a data structure each detection incident.

Figures 13, 14:
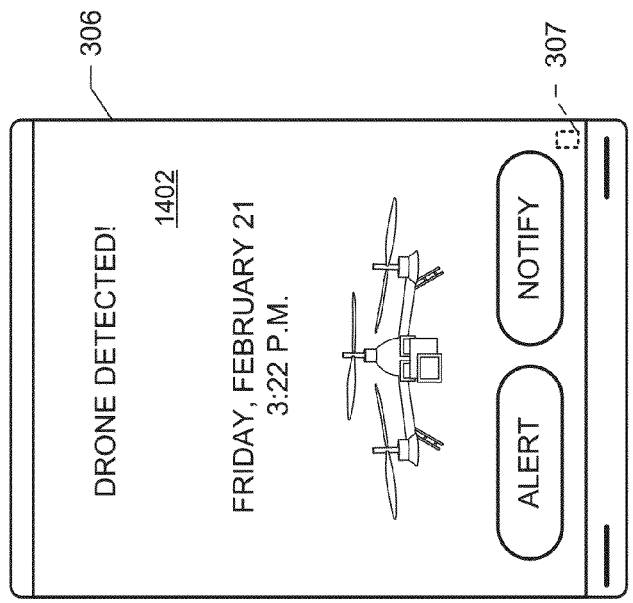
FIG. 13 shows a data structure of drone detections created by the sample processor of FIGS. 3 and 4 and/or the management server of FIG. 3, according to an example embodiment of the present disclosure.
FIG. 14 shows an alert displayed by a user device via an application, according to an example embodiment of the present disclosure.

For example, FIG. 13 shows a data structure 1300 created by the alert generator 416. The data structure 1300 stores detection incidents including, for example, a time, date, duration, and location of the detection. The data structure 1300 also includes drone classification information including the drone class, the brand, and the model. The data structure 1300 may also include an identifier of a microphone and/or drone detection device 302 (when multiple drone detection devices 302 are used in conjunction with each other by a common user).

The storage of alerts may be used to preserve evidence of drone incursions for subsequent legal suits or the prosecution of criminal activity. In addition, the alert generator 416 may control a camera in communication with the drone detection device 302 (e.g., via the network interface 336 and/or the switch 334). In conjunction with creating an alert, the alert generator 416 may cause the camera to record video and/or still pictures of the drone 304 and store the recorded images in association with a record of the incursion. In some instances, the recorded images may be transmitted within the alert message.

FIG. 14 shows an alert 1402 displayed by the user device 306 via the application 307. The alert generator 416 may transmit the alert 1402 via the network interface 336 and the network 312 to the user device 306. The application 307 may be configured to render the alert 1402 based on the format in which the alert is received. In this embodiment, the alert 1402 includes a "Drone Detected!" message, a time and date of detection, and a representative picture of the detected drone class, make/model, brand (or actual picture of the drone). The alert 1402 also includes options to enable the user to notify the management server 308 and/or authorities (e.g., the police, FBI, etc.) of the intrusion. The alert 1402 may also include an option to take addition countermeasures (e.g., the 'Alert' button), which causes, for example, the sample processor 324 to activate the switch 334 to close window shades, etc. The countermeasures may also include transmitting an alert to a security team or local authorities. It should be appreciated that the alert 1402 shown in FIG. 14 is only one type of alert that could be transmitted by the alert generator 416. For instance, the alert 1402 may be included within an email sent to an email account of the user or the alert may be transmitted within a text message and displayed by a messaging application.

IX. Location Calibrator

The example sample processor 324 of FIG. 4 includes a location calibrator 418 to adjust drone sound samples and/or digital sound samples based on environmental characteristics specific to the detection environment 300. For instance, each property and/or building has unique features that affect acoustic signals or tones generated by drones. Some building features, landscaping, or microphone location may cause certain frequencies to be attenuated, amplified, shifted, etc. Such change in frequencies may reduce the accuracy of detections.

To improve detection accuracy, the location calibrator 418 is configured to determine how environmental characteristics change frequency response and accordingly apply frequency or digital signal corrections. The location calibrator 418 may also determine and compensate for environmental noise. The location calibrator 418 may apply the corrections to the digital samples, the frequency amplitude vectors, the composite frequency amplitude vectors and/or the feature frequency spectrum (or drone sound signature). The corrections may include, for example, frequency shifts, digital signal filtering, digital signal phase shifting, digital signal peak smoothing, etc.

In an embodiment, a user may perform a calibration routine using the location calibrator 418 and a sound machine (e.g., the user device 306). The sound machine may simulate a drone and generate sound signals with known properties. The location calibrator 418 compares received calibration digital sound signals and/or processed feature frequency spectrums to known calibration digital sound signals and calibration frequency spectrums for the generated sound signal. The location calibrator 418 determines differences between the measured and known signals and accordingly determines tuning parameters and/or filters to compensate for the differences. The frequency processor 406, the filter 408, the composite vector processor 410, the sample comparer 412, and/or the classifier 414 may apply the tuning parameters and/or filters based on whether the digital sound signal, the frequency vector, or the feature frequency spectrum is being adjusted.

In some instances the sound machine may generate different sound signals. In these instances, the user may provide an indication to the location calibrator 418 as to which calibration sound signal is being generated. This indication enables the location calibrator 418 to select the appropriate calibration digital sound sample and/or calibration frequency spectrum. The different calibration sound signals may be specifically designed to calibrate for particular tones and/or ranges of tones.

In some embodiments, the application 307 may function as the sound machine. For instance, the application 307 may cause the user device 306 (or a connected speaker) to output calibration sound signals. The application 307 may also transmit to the location calibrator 418 an indication of which calibration sound signal is being played.

In an alternative embodiment, the location calibrator 418 may adaptively calibrate the drone detection device 302 during normal use. For example, the location calibrator 418 may determine differences between one or more feature frequency spectrums and a drone sound signature having a lowest Wasserstein value for one or more 'hits.' In some instances, the calibration may only be performed if the lowest Wasserstein value is below a certain threshold to ensure that there is a substantial match. The location calibrator 418 may then determine parameters and/or filter values that would cause the feature frequency spectrums to have substantially zero difference with the corresponding drone sound signatures. The location calibrator 418 then applies these parameters and/or filter values.

X. Feedback Processor

The example sample processor 324 of FIG. 4 includes a feedback processor 420 to refine detections based on false-positive detections and false-negatives. For example, after the alert generator 416 transmits an alert, a user may provide feedback that there is in fact no drone within a vicinity of the drone detection device 302. The user may provide the feedback via, for example, the application 307. The user may also switch a false-positive button included with the drone detection device 302.

Responsive to receiving the feedback, the feedback processor 420 is configured to determine the one or more drone sound signatures that generated the false-positive detection. The feedback processor 420 stores a flag or other indication in association with the drone sound signatures (or drone sound samples) indicating that a match is not a 'hit' or 'partial-hit'. The feedback processor 420 may also transmit information identifying the drone sound signatures (or drone sound samples) to the management server 308, which may relay the false-positive indication to other drone detection devices 302.

The feedback processor 420 may also be configured to process false-negative feedback from a user. For instance, a user may notice a drone incursion and realize an alert was not generated. The user may provide an indication via, for example, the application 307, that a drone detection was missed. The user may also provide a time/date of the missed detection. Responsive to receiving the false-negative feedback, the feedback processor 420 is configured to determine the feature frequency spectrums and/or digital sound samples that were recorded and processed at the time the drone was spotted by the user. The feedback processor 420 may store the digital sound samples as new drone samples and/or store the feature frequency spectrums as new drone sound signatures. The feedback processor 420 may prompt the user for the drone class, make/model, brand, flight characteristic, etc. (e.g., "How many rotors did the drone have?", "Select a picture that corresponds to the drone.", "Select how the drone was flying." etc.). The feedback processor 420 uses the information provided by the user as metadata or information stored in association with the drone sound sample, as shown in FIG. 6.

The feedback processor 420 may also determine the drone information if a user is unable to provide information. The feedback processor 420 may determine which drone sound samples and/or drone sound signatures are closest to the sound signature or sound sample associated with the false-negative detection. The feedback processor 420 uses the information from the closest drone sound samples and/or drone sound signatures as the information associated with the false-negative detection.

The feedback processor 420 is also configured to transmit newly detected drone sound samples to the management server 308. The feedback processor 420 may transmit the information provided by the user. The management server 308 may compile newly detected sound samples and send out periodic updates to the other users 310. In this manner, the drone detection devices 302 provide an adaptive learning system that automatically updates other devices when new drones are detected.

Flowchart of the Example Process

Figure 15:
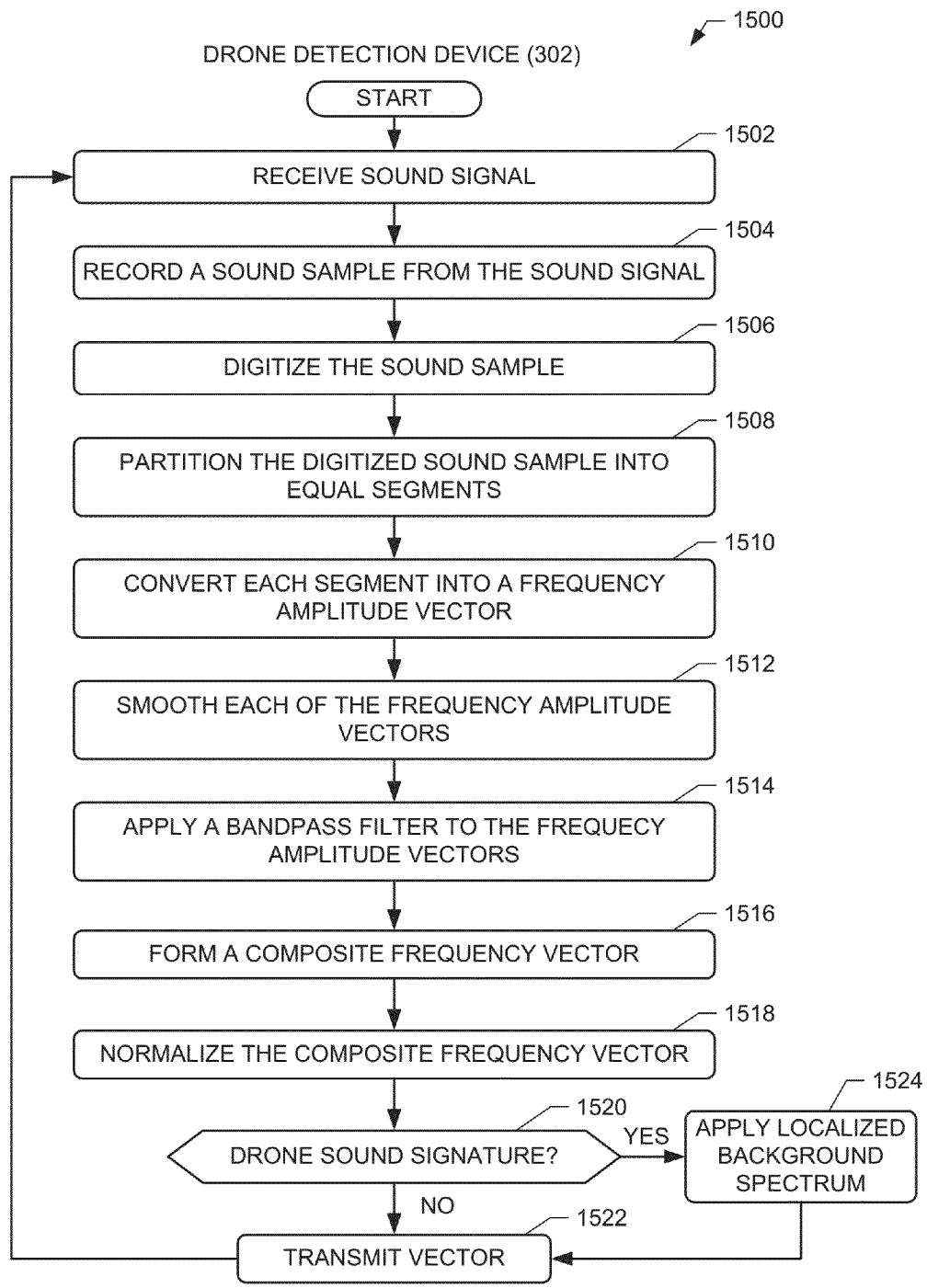
FIG. 15 illustrates a flow diagram showing an example procedure to create a feature frequency spectrum and/or drone sound signature, according to an example embodiment of the present disclosure.

FIG. 15 illustrates a flow diagram showing an example procedure 1500 to create drone sound signatures and/or feature frequency spectrums, according to an example embodiment of the present disclosure. Although the procedure 1500 is described with reference to the flow diagram illustrated in FIG. 15, it should be appreciated that many other methods of performing the steps associated with the procedure 1500 may be used. For example, the order of many of the blocks may be changed, certain blocks may be combined with other blocks, and many of the blocks described are optional. Further, the actions described in procedure 1500 may be performed among multiple devices including, for example the frequency processor 406, the filter 408, the composite vector processor 410 (collectively the sample processor 324), the microphone 320, and/or the sound card 322.

The example procedure 1500 of FIG. 15 operates on, for example, the drone detection device 302 of FIG. 3. The procedure 1500 begins when the microphone 320 receives a sound signal (block 1502). The sound card 322 then records and digitizes the sound signal as a digital sound sample (blocks 1504 and 1506). The sample processor 324 partitions the digitized sound sample into equal segments (block 1508).

The sample processor 324 converts each segment into a frequency amplitude vector by determining an absolute value of a FFT applied to the segment (block 1510). The sample processor 324 also applies a sliding median filter to smooth each frequency amplitude vector (block 1512). The sample processor 324 may also apply a bandpass filter to the smoothed frequency amplitude vectors to remove noise (block 1514). The sample processor 324 then forms a composite frequency vector my averaging the smoothed filtered frequency amplitude vectors associated with the same digital sound sample (block 1516). The sample processor 324 may further normalize the composite frequency vector (block 1518). In some embodiments, the bandpass filtering in block 1514 may be performed after the composite frequency vector is formed and/or after the normalization.

In instances where the example procedure 1500 is for drone sound samples, the steps associated with blocks 1502 to 1506 may be omitted. The sample processor 324 begins by partitioning drone sound samples into equal segments in block 1508. The sample processor 324 then continues in the same manner as described above in conjunction with blocks 1510 to 1518.

The example procedure 1500 of FIG. 15 continues by determining if the resulting frequency spectrum is a drone sound signature or a feature frequency spectrum (block 1520). Conditioned on the resulting frequency spectrum being a feature frequency spectrum, the example sample processor 324 transmits the feature frequency spectrum (e.g., the vector) for comparison to drone sound signatures (block 1522). The example procedure 1500 then returns to block 1502 to process another sound signal.

Conditioned on the resulting frequency spectrum being a drone sound signature (block 1520), the example sample processor 324 applies localized background spectrums (e.g., parameters, filters, etc.) determined from a calibration performed by the location calibrator 418. The example sample processor 324 then transmits the drone sound signature (e.g., the vector) for comparison to feature frequency spectrums (block 1522). The example procedure 1500 then returns to block 1502 to process another sound signal and/or to block 1508 to process another drone sound sample.

Figure 16:
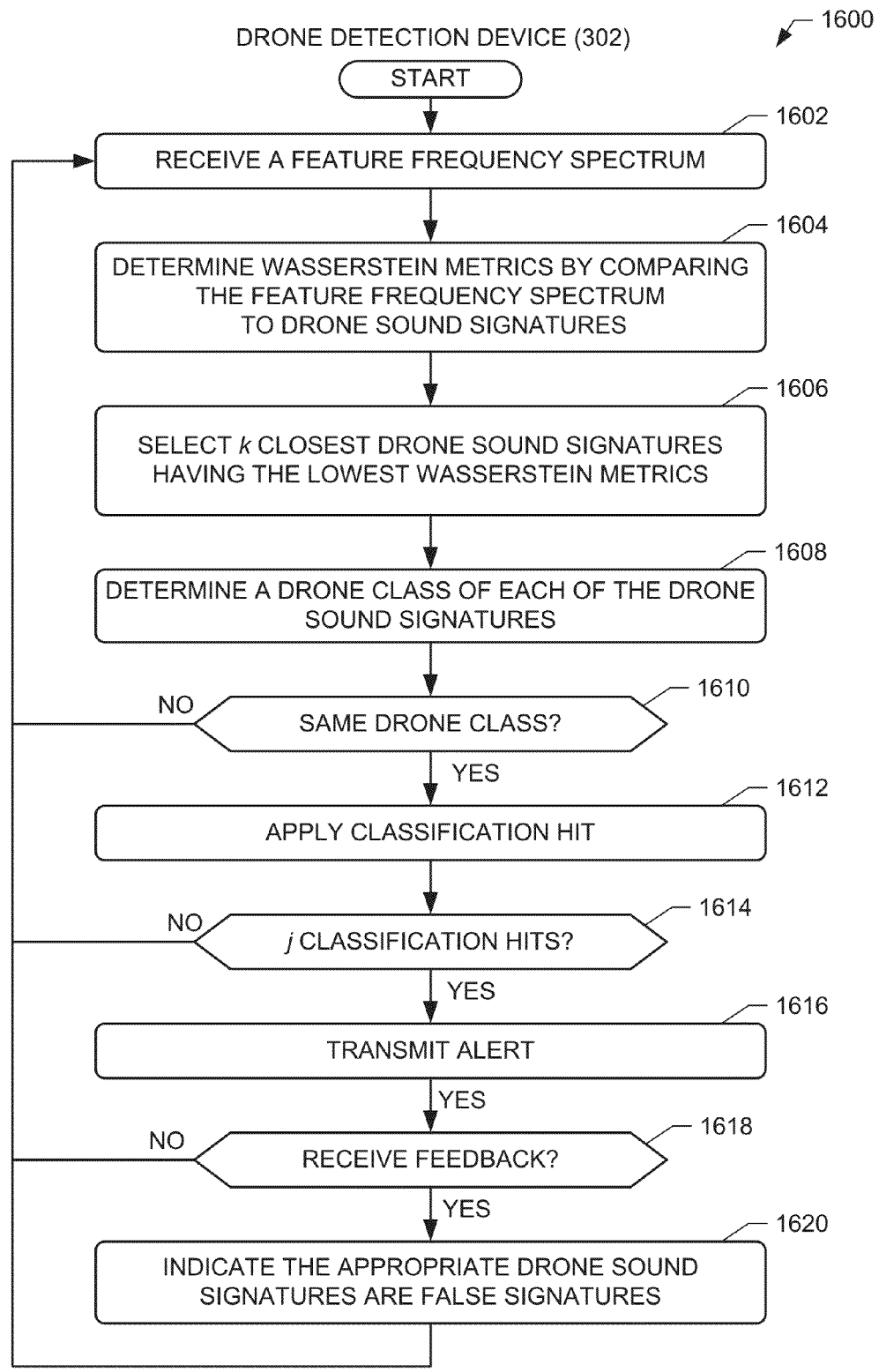
FIG. 16 illustrates a flow diagram showing an example procedure to detect and classify drones, according to an example embodiment of the present disclosure.

FIG. 16 illustrates a flow diagram showing an example procedure 1600 to detect and/or classify a drone, according to an example embodiment of the present disclosure. Although the procedure 1600 is described with reference to the flow diagram illustrated in FIG. 16, it should be appreciated that many other methods of performing the steps associated with the procedure 1600 may be used. For example, the order of many of the blocks may be changed, certain blocks may be combined with other blocks, and many of the blocks described are optional. Further, the actions described in procedure 1600 may be performed among multiple devices including, for example the sample comparer 412, the classifier 414, the alert generator 416, the feedback processor 420 (collectively the sample processor 324), and/or the network interface 336.

The example procedure 1600 of FIG. 16 operates on, for example, the drone detection device 302 of FIG. 3. The procedure 1600 begins after the sample processor 324 of the drone detection device 302 has converted a digital sound sample into a feature frequency spectrum, as described in conjunction with FIG. 15 (block 1602). The sample processor 324 compares the feature frequency spectrum to each drone sound signature and determines a Wasserstein metric for each comparison (block 1604). The sample processor 324 then determines which drone sound signature is associated with the lowest Wasserstein metric and which k drone sound signatures are associated with the next lowest Wasserstein metrics (block 1606). The k value may be selected by a user, manufacturer, etc. It should be appreciated that more accurate detections may be made with relatively larger k values.

The example processor 324 next determines a drone class, for example, associated with the drone sound signatures associated with the lowest and next lowest k Wasserstein metrics (block 1608). The example sample processor 324 then compares the drone class of the drone sound signatures associated with the lowest and next lowest k Wasserstein metrics (block 1610). Conditioned on the drone class being the same for all of the drone sound signatures, the example sample processor 324 designates the broad spectrum match as a 'hit' (block 1612). Conditioned on not all of the drone classes being the same for all of the drone sound signatures, the example sample processor 324 determines the feature frequency spectrum did not originate from a known drone and returns to processing additional feature frequency spectrums (block 1602). In some embodiments, the sample processor 324 may designate a detection as a 'partial-hit' if some of the drone sound signatures are associated with the same class.

Returning to block 1612, after applying a 'hit' classification, the sample processor 324 determines if there have been a j number of consecutive 'hits' associated with the same drone class (block 1614). In other embodiments, the number of 'hits' may be compared to a threshold of a number of 'hits' within a designated time period (e.g., ten seconds). As discussed, the j value may be selected by a user, manufacturer, etc. If the number of 'hits' is less than the j value, the sample processor 324 returns to block 1602 to process the next feature frequency spectrum. However, conditioned on the number of 'hits' meeting the j value, the sample processor 324 determines that a drone has been detected and creates/transmits an alert (block 1616). As discussed, the alert may include an indication of the drone class, a flight characteristic of the drone, a time of detection, a picture of the drone, etc. The sample processor 324 may also store a record of the drone detection.

The sample processor 324 may also determine if feedback has been received regarding the detection (block 1618). If not feedback has been received, the example sample processor 324 returns to block 1602 to process the next feature frequency spectrum. However, conditioned on receiving feedback, the sample processor 324 determines the drone sound signatures associated with the detection and creates and indication that these signatures correspond to false detections (block 1620). This feedback prevents the sample processor 324 from issuing an alert for subsequent feature frequency spectrums that match the drone sound signatures associated with the false-positive detection. The example sample processor 324 then returns to block 1602 to process the next feature frequency spectrum.

Application

As discussed throughout, the example application 307 of FIG. 3 is configured to enable a user to provision, calibrate, record drone sound samples, receive alerts, and communicate with the drone detection device 302. In addition, the application 307 may include features that use alert information to provide a more comprehensive alert. For example, the application 307 may receive an indication of an alert including a geographic location of the drone detection device 302 that made the alert and/or a recorded flight path. The application 307 may determine the geographic location on a map and render the map including the detection and positions of drone detection device(s) owned by the user. The application 307 may also display the flight path on the map, as shown in FIG. 12.

The application 307 may also enable a user to record drone sound samples and update the drone database 326 and/or the management server 308 with the recording. For example, a user may come in contact with a drone anywhere. The user may activate the application 307 on the user device 306 and record the tone emitted by the drone. The application 307 may also prompt the user for information regarding the drone including, for example, drone class, make/model, brand, and observed flight characteristics (stored in conjunction with the time of the recording in which the flight characteristic took place).

The application 307 may be a standalone application stored locally to the user device. Alternatively, the application 307 may be accessible via a web page or website hosted by, for example, the management server 308. The application 307 may also comprise an interface that enables direct access of data and information on the drone detection device 302 and/or the management server 308.

It should be appreciated that in some embodiments some of all of the drone detection device 302 may be implemented by the application 307 and/or the user device 306. For example, microphones and sound cards within a smartphone may implement the microphone 320 and the sound card 322 of FIG. 3. Further, the sample processor 324 may be implemented by instructions stored in association with the application 307 executed by one or more processors on a smartphone. Moreover, the light source 330 and audio source 332 may be implemented by speakers and/or LEDs on a smartphone. A smartphone may be in wireless communication with remotely located switches 334. Additionally, the cellular, WLAN, and other wireless interfaces of a smartphone may implement the network interface 336 features. In this manner, the application 307 enables any smartphone, tablet computer, laptop, etc. to operate as a drone detection device 302.

Management Server

The example management server 308 of FIG. 3 is configured to manage the distribution of drone sound signatures and/or drone sound samples. As discussed, the management server 308 is configured to receive drone sound samples from anyone that makes a recording of a drone. The management server 308 is also configured to prompt individuals for information regarding the recording including, for example drone class, drone make/model, flight characteristics, etc. In some instances, the management server 308 may host a website that enables individuals to upload drone sound samples. The website may prompt the individuals for information including showing individuals representative pictures of different drones and associating drone information based on a selected picture. In some embodiments, the management server 308 may determine drone information by analyzing the received drone sound samples and/or comparing the samples to known drone sound samples.

The management server 308 is also configured to compile drone detections and make these detections graphically available to owners of drone detection devices, subscribing members, and/or the general public. FIG. 13 shows the data structure 1300, which may be compiled by the management server 308 based on detections by a plurality of users. In some instances, different users provide different types of geographic information, which is resolved by the management server 308 into the appropriate location on a graphical representation. In these instances, a user may opt out of having detection information stored or request that detection information remain anonymous (e.g., no geographic information included or very general geographic information included, such as a town).

Figure 17:
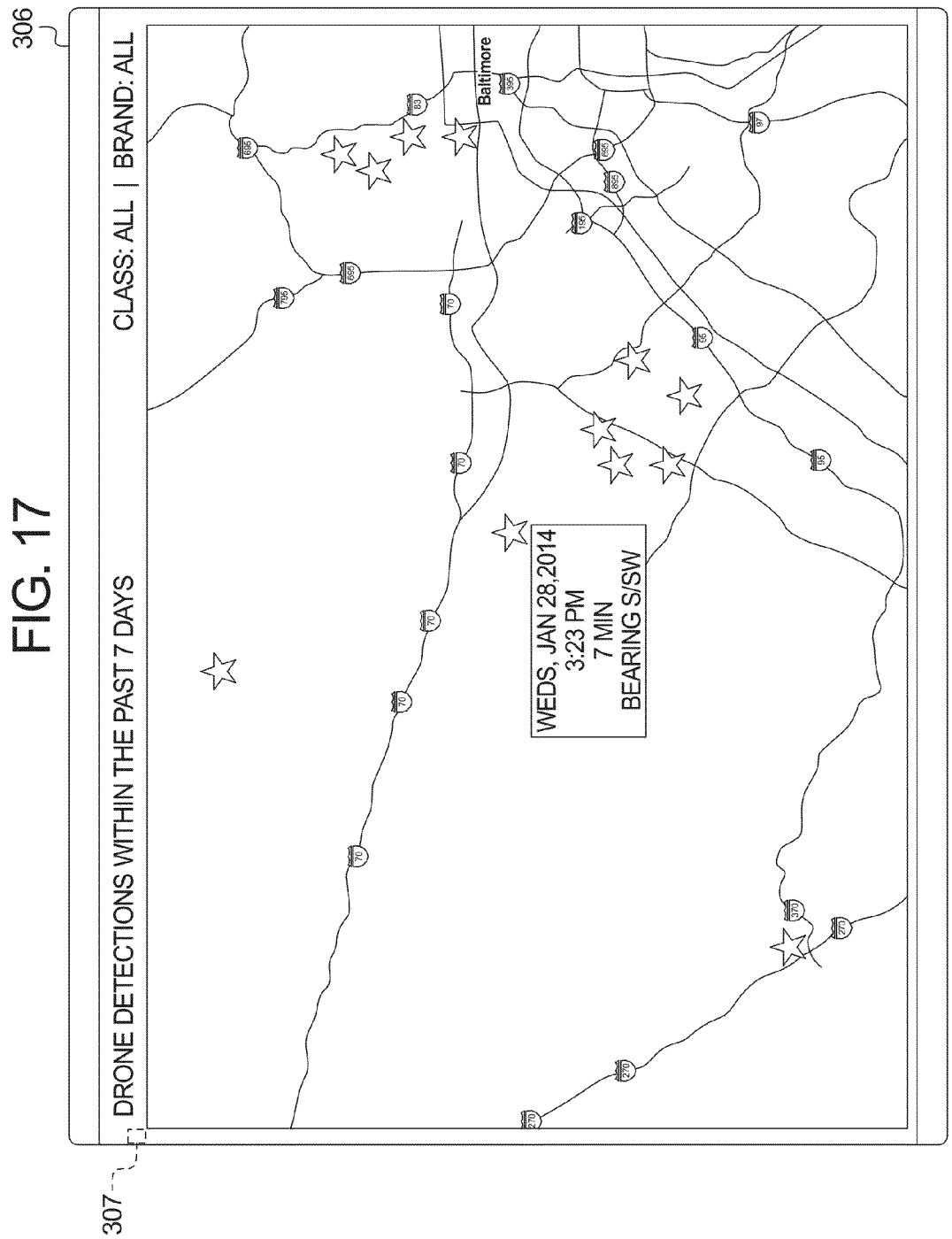
FIG. 17 shows a graphical representation of detections generated by a management server and displayed by a user device via an application.

FIG. 17 shows a graphical representation 1700 of detections generated by the management server 308 and displayed by the user device 306 via the application 307. The graphical representation 1700 includes detections from multiple users (as denoted by the stars). The management server 308 may update the graphical representation in real-time as detections are received. A user may select one of the stars to view additional information regarding the detection including, for example, drone class, date/time of the detection, duration, bearing of the drone, etc. The management server 308 and/or the application 307 may enable a user to filter the data for specific locations, time periods, drone class, drone brand, etc.

The example management server 308 may also alert users to approaching drones. For example, the management server 308 may receive a detection of a drone at a certain address. The management server 308 may then determine users who are within vicinity of the detection area or own property within vicinity of the detection area (e.g., within five miles of the detection). The management server 308 transmits an alert to the corresponding user devices 306 regarding the nearby drone. The management server 308 may also transmit a message to the drone detection devices 302 within vicinity, which may cause the devices to activate or adjust detection thresholds as a result of a likely impending detection.

Processor

Figure 18:
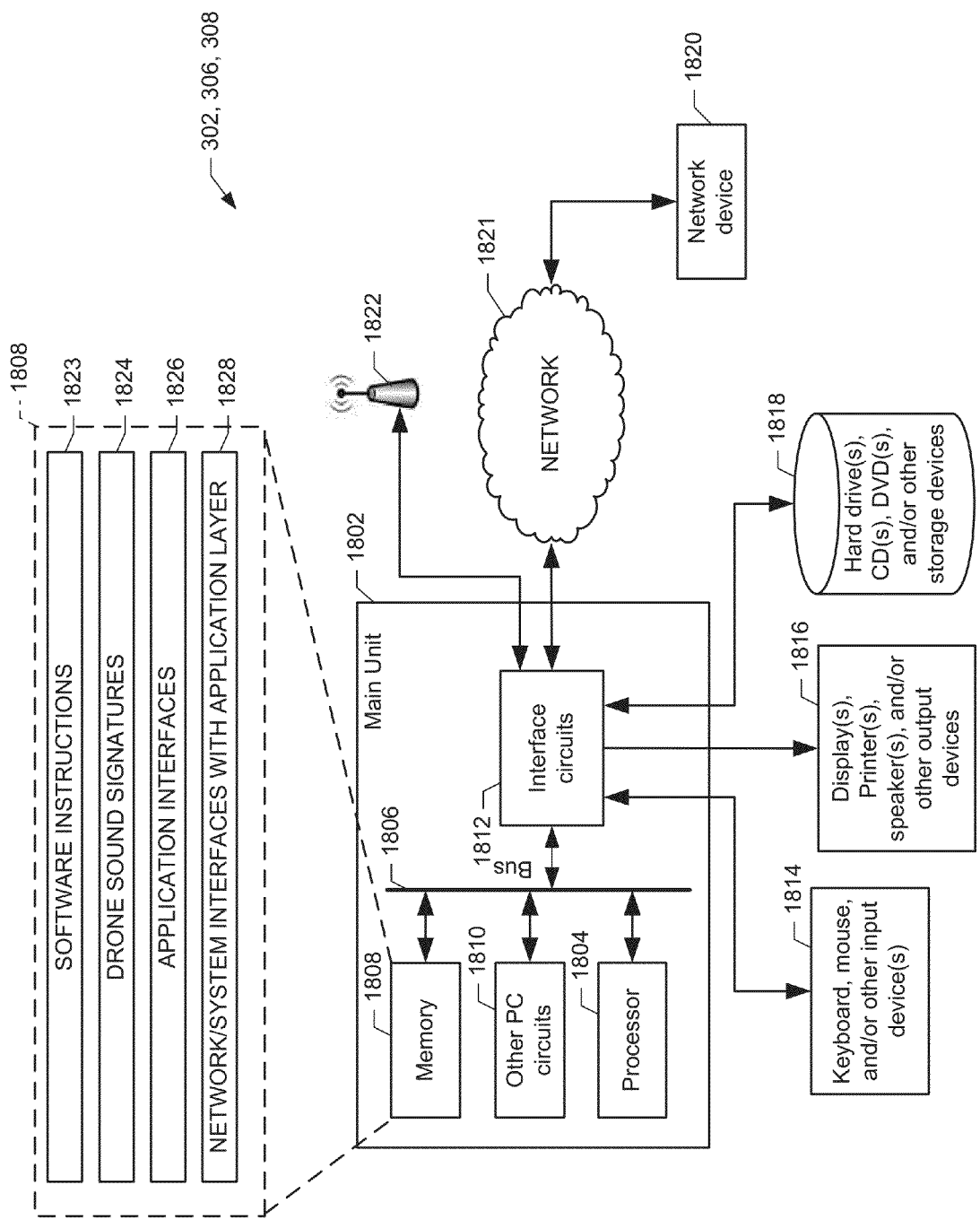
FIG. 18 shows a detailed block diagram of an example a sample processor, user device and/or management server, according to an example embodiment of the present disclosure.

A detailed block diagram of electrical systems of an example computing device (e.g., the setup processor 402, the database manager 404, the frequency processor 406, the filter 408, the composite vector processor 410, the sample comparer 412, the classifier 414, the alert generator 416, the location compensator 418 and the feedback processor 420 (collectively the sample processor 324 or the drone detection device 302), the user device 306, and/or the management server 308) is illustrated in FIG. 18. In this example, the devices 302, 306, and 308 include a main unit 1802 which preferably includes one or more processors 1804 communicatively coupled by an address/data bus 1806 to one or more memory devices 1808, other computer circuitry 1810, and one or more interface circuits 1812. The processor 1804 may be any suitable processor, such as a microprocessor from the INTEL PENTIUM.RTM or CORE family of microprocessors. The memory 1808 preferably includes volatile memory and non-volatile memory. Preferably, the memory 1808 stores a software program that interacts with the other devices in the environment 300, as described above. This program may be executed by the processor 1804 in any suitable manner. In an example embodiment, memory 1808 may be part of a "cloud" such that cloud computing may be utilized by devices 302, 306, and 308. The memory 1808 may also store digital data indicative of documents, files, programs, webpages, drone sound samples, drone sound signatures, drone information, etc. retrieved from (or loaded via) devices 302, 306, and 308.

The example memory devices 1808 store software instructions 1823, drone sound signatures 1824 (or drone sound samples), user interface features, permissions, protocols, identification codes, audio files, content information, registration information, event information, and/or configurations. The memory devices 1808 also may store network or system interface features, permissions, protocols, configuration, and/or preference information 1828 for use by the devices 302, 306, and 308. It will be appreciated that many other data fields and records may be stored in the memory device 1808 to facilitate implementation of the methods and apparatus disclosed herein. In addition, it will be appreciated that any type of suitable data structure (e.g., a flat file data structure, a relational database, a tree data structure, etc.) may be used to facilitate implementation of the methods and apparatus disclosed herein.

The interface circuit 1812 may be implemented using any suitable interface standard, such as an Ethernet interface and/or a Universal Serial Bus ("USB") interface. One or more input devices 1814 may be connected to the interface circuit 1812 for entering data and commands into the main unit 1802. For example, the input device 1814 may be a keyboard, mouse, touch screen, track pad, track ball, isopoint, image sensor, character recognition, barcode scanner, microphone, and/or a speech or voice recognition system.

One or more displays, printers, speakers, and/or other output devices 1816 may also be connected to the main unit 1802 via the interface circuit 1812. The display may be a cathode ray tube ("CRTs"), a liquid crystal display ("LCD"), or any other type of display. The display generates visual displays generated during operation of the device 302, 306, and 308. For example, the display may provide a user interface and may display one or more webpages received from the device 302, 306, and 308. A user interface may include prompts for human input from a user of the devices 302, 306, and 308 including links, buttons, tabs, checkboxes, thumbnails, text fields, drop down boxes, etc., and may provide various outputs in response to the user inputs, such as text, still images, videos, audio, and animations.

One or more storage devices 1818 may also be connected to the main unit 1802 via the interface circuit 1812. For example, a hard drive, CD drive, DVD drive, and/or other storage devices may be connected to the main unit 1802. The storage devices 1818 may store any type of data, such as identifiers, identification codes, registration information, content information, drone sound samples, drone sound signatures, calibration sound samples, calibration sound signatures, media content, image data, video data, audio data, drone information, detection information, or usage data, statistical data, security data, etc., which may be used by the devices 302, 306, and 308.

The computing device 302, 306, and 308 may also exchange data with other network devices 1820 via a connection to a network 1821 (e.g., the Internet) or a wireless transceiver 1822 connected to the network 1821. Network devices 1820 may include one or more servers, which may be used to store certain types of data, and particularly large volumes of data which may be stored in one or more data repository. A server may process or manage any kind of data including databases, programs, files, libraries, identifiers, identification codes, registration information, content information, drone sound samples, drone sound signatures, calibration sound samples, calibration sound signatures, media content, image data, video data, audio data, drone information, detection information, or usage data, statistical data, security data, etc. A server may store and operate various applications relating to receiving, transmitting, processing, and storing the large volumes of data. It should be appreciated that various configurations of one or more servers may be used to support, maintain, or implement the devices 302, 306, and 308 of the environment 300. For example, servers may be operated by various different entities, including operators of the management server 308, drone manufacturers, users, drone detection organizations, service providers, etc. Also, certain data may be stored in one of the devices 302, 306, and 308 which is also stored on a server, either temporarily or permanently, for example in memory 1808 or storage device 1818. The network connection may be any type of network connection, such as an Ethernet connection, digital subscriber line ("DSL"), telephone line, coaxial cable, wireless connection, etc.

Access to the devices 302, 306, and 308 can be controlled by appropriate security software or security measures. An individual third-party client or consumer's access can be defined by the device 302, 306, and 308 and limited to certain data and/or actions. Accordingly, users of the environment 300 may be required to register with one or more computing devices 302, 306, and 308.

CONCLUSION

It will be appreciated that all of the disclosed methods and procedures described herein can be implemented using one or more computer programs or components. These components may be provided as a series of computer instructions on any computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for detecting drones comprising:
    receiving a sound signal in a microphone;
    recording, via a sound card, a digital sound sample of the sound signal, the digital sound sample having a predetermined duration;
    processing, via a processor, the digital sound sample into a feature frequency spectrum;
    applying, via the processor, broad spectrum matching to compare the feature frequency spectrum to at least one drone sound signature stored in a database, the at least one drone sound signature corresponding to a flight characteristic of a drone model; and
    conditioned on matching the feature frequency spectrum to one of the drone sound signatures, transmitting, via the processor, an alert.

2. The method of claim 1, wherein:
    applying broad spectrum matching includes determining a Wasserstein metric for each of the drone sound signatures compared to the feature frequency spectrum; and matching the feature frequency spectrum includes determining at least one of the determined Wasserstein metrics is below a threshold value.

3. The method of claim 2, further comprising:
recording, via the sound card, a number of consecutive digital sound samples from the sound signal, each of the consecutive digital sound samples having the predetermined duration;
processing, via the processor, each of the digital sound samples into a respective feature frequency spectrum;
for each of the feature frequency spectrums:
applying, via the processor, broad spectrum matching to compare the feature frequency spectrum to the at least one sound signature by determining a Wasserstein metric for each of the drone sound signatures compared to the feature frequency spectrum,
selecting, via the processor, a number of the Wasserstein metrics that have the lowest values compared to all of the Wasserstein metrics for the feature frequency spectrum,
determining, via the processor, a drone class for each of the selected number of the Wasserstein metrics based on the corresponding drone sound signature referenced to at least one of the drone model or the drone class, and
applying, via the processor, a hit classification to the feature frequency spectrum conditioned on substantially all of the selected number of the Wasserstein metrics corresponding to the same drone class; and
conditioned on determining, via the processor, a number of consecutive hit classifications, transmitting the alert.

4. The method of claim 1, wherein processing the sound sample into the digital sound sample includes:
partitioning the digital sound sample into equal-sized non-overlapping segments;
converting each of the segments into a vector of frequency amplitudes by determining an absolute value of a Fast Fourier Transform applied to the segment;
smoothing the vectors of each of the segments using a sliding median filter;
forming a composite frequency vector by averaging the smoothed vectors; and
normalizing the composite frequency vector to have a unit sum to create the feature frequency spectrum.

5. The method of claim 4, further comprising transmitting the at least one of the feature frequency spectrum and the digital sound sample to a remotely located server including the indication of the drone.

6. The method of claim 1, wherein transmitting the alert includes transmitting at least one of a text message and an e-mail to a user.

7. The method of claim 1, further comprising:
receiving an indication from a user that the alert is false;
determining the matched drone sound signature used to transmit the alert; and
storing a false signature indication to the matched drone sound signature.

8. The method of claim 1, further comprising:
determining the feature frequency spectrum does not match the at least one drone sound signature;
receiving an indication from a user that the feature frequency spectrum corresponds to a drone class; and
storing the feature frequency spectrum as a drone sound signature and an indication of the drone class.

9. The method of claim 8, further comprising:
receiving at least one of the drone model and the drone flight characteristic from the user; and
storing the at least one of the drone model and the drone flight characteristic in conjunction with the feature frequency spectrum stored as the drone sound signature.

10. The method of claim 1, wherein the flight characteristics include at least one of retreating, sideways translating, rotating, hovering, inverting, ascending, and descending.

11. The method of claim 1, wherein the drone model includes at least one of a brand name, a part number, and a rotor configuration.

12. The method of claim 1, further comprising, before applying broad spectrum matching, incorporating, via the processor, a background spectrum into each of the drone sound signatures, the background spectrum corresponding to specific acoustic conditions at a location of the microphone.

13. An apparatus for detecting drones comprising:
a microphone configured to receive a sound signal;
a sound card configured to record a digital sound sample of the sound signal, the digital sound sample having a predetermined duration; and
a sample processor configured to:
process the digital sound sample into a feature frequency spectrum,
process at least one drone sound sample into a drone sound signature,
use broad spectrum matching to compare the feature frequency spectrum to the at least one drone sound signature, the at least one drone sound signature corresponding to a drone class and a flight characteristic of a drone, and
conditioned on matching the feature frequency spectrum to one of the drone sound signatures, transmit an alert.

14. The apparatus of claim 13, wherein the sample processor is configured to process the at least one drone sound sample into the drone sound signature after activation of the apparatus.

15. The apparatus of claim 13, wherein the sample processor is configured to be calibrated for local acoustic characteristics by:
receiving a calibration digital sound sample recorded by the sound card, the calibration digital sound sample being transmitted by a user device and sensed by the microphone;
processing the calibration digital sound sample into a calibration frequency spectrum;
determining differences between the calibration frequency spectrum and a calibration sound signature;
determining variable values of an algorithm used to process the calibration digital sound sample into the calibration frequency spectrum such that the calibration frequency spectrum substantially matches the calibration sound signature; and
applying the determined variable values to the algorithm for normal operation.

16. The apparatus of claim 13, further comprising at least one of:
a light source configured to illuminate responsive to receiving the alert from the sample processor; or
a speaker configured to output an audible tone responsive to receiving the alert from the sample processor, wherein the audible tone is included within the alert.

17. The apparatus of claim 16, wherein the at least one of the light source or the speaker is remote from the apparatus and wirelessly communicatively coupled to the sample processor.

18. The apparatus of claim 13, further comprising a relay configured to switch to a closed state responsive to receiving the alert from the sample processor.

19. A non-transitory machine-accessible device having instructions stored thereon that are configured, when executed, to cause a machine to at least:
- receive a digital sound sample from a sound card;
- partition the digital sound sample into equal-sized non-overlapping segments;
- convert each of the segments into a frequency amplitude vector by determining an absolute value of a Fast Fourier Transform applied to the segment;
- smooth the each of the frequency amplitude vectors of each of the segments using a sliding median filter;
- create a composite frequency vector by averaging the smoothed vectors;
- create a feature frequency spectrum by normalizing the composite frequency vector to have a unit sum;
- apply broad spectrum matching to compare the feature frequency spectrum to at least one drone sound signature stored in a database, the at least one drone sound signature corresponding to a drone class and a flight characteristic of a drone; and
- conditioned on matching the feature frequency spectrum to at least one of the drone sound signatures, transmit an alert including the drone class, a time of detection, and a date of detection.

20. The non-transitory machine-accessible device of claim 19, further comprising instructions stored thereon that are configured when executed to cause the machine to:
- determine the drone class corresponds to a friend drone class, the drone class previously being specified by a user; and
- conditioned on the drone class corresponding to the friend drone class, determine the alert is not to be transmitted.

21. The non-transitory machine-accessible device of claim 19, further comprising instructions stored thereon that are configured when executed to cause the machine to:
- determine a time period during which digital sound samples from the drone are received;
- determine distances of the drone during the time period from a microphone that sensed sound signals corresponding to the digital sound samples;
- determine headings of the drone during the time period based on the digital sound samples;
- determine a flight path of the drone during the time period based on the determined distances, the headings, and the flight characteristics; and
- cause a graphical representation of the flight path to be displayed by a user device to a user.

22. The non-transitory machine-accessible device of claim 19, further comprising instructions stored thereon that are configured when executed to cause the machine to:
- transmit a first context of the alert to user device; and
- transmit a second context of the alert, different from the first context, to a management server causing the management server to display the alert at a geographic location on map in conjunction with alerts from other users.

* * * * *